(12) United States Patent
King et al.

(10) Patent No.: US 7,598,863 B2
(45) Date of Patent: Oct. 6, 2009

(54) METHOD AND APPARATUS FOR MAKING STATUS REPORTING DEVICES FOR CONTAINER HANDLERS

(75) Inventors: Henry S. King, Moraga, CA (US); Toru Takehara, Foster City, CA (US)

(73) Assignee: Paceco Corp., Hayward, CA (US)

( * ) Notice: Subject to any disclaimer, the term of this patent is extended or adjusted under 35 U.S.C. 154(b) by 1065 days.

(21) Appl. No.: 11/130,822

(22) Filed: May 16, 2005

(65) Prior Publication Data

US 2005/0256608 A1 Nov. 17, 2005

Related U.S. Application Data

(60) Provisional application No. 60/571,009, filed on May 14, 2004.

(51) Int. Cl.
 *G08B 13/14* (2006.01)
(52) U.S. Cl. .............. 340/572.1; 340/539.13; 340/539.16; 340/825.49; 340/825.69; 340/989; 340/990; 700/214; 700/229; 235/385
(58) Field of Classification Search .............. 340/572.1, 340/539.13, 539.16, 825.49, 825.69, 989, 340/990; 235/383, 385; 342/357.09; 700/214, 700/229; 701/207, 208
See application file for complete search history.

(56) References Cited

U.S. PATENT DOCUMENTS

| | | | |
|---|---|---|---|
| 4,796,209 A | 1/1989 | Burk | |
| 4,906,940 A | 3/1990 | Greene et al. | |
| 5,327,354 A | 7/1994 | Tsujimoto | |
| 5,388,945 A | 2/1995 | Garric et al. | |
| 5,780,826 A | 7/1998 | Hareyama et al. | |
| 5,805,747 A | 9/1998 | Bradford | |
| 5,920,287 A | 7/1999 | Belcher et al. | |
| 6,317,082 B1 | 11/2001 | Bacon et al. | |
| 6,409,451 B1 | 6/2002 | Fallin et al. | |
| 6,429,016 B1 | 8/2002 | McNeil | |
| 6,483,434 B1 | 11/2002 | UmiKer | |
| 6,577,275 B2 | 6/2003 | Turner | |
| 6,577,921 B1 | 6/2003 | Carson | |
| 6,768,931 B2 * | 7/2004 | Takehara et al. | ............ 700/225 |
| 6,826,452 B1 | 11/2004 | Holland et al. | |
| 2002/0104879 A1 | 8/2002 | Wohl et al. | |
| 2003/0069648 A1 | 4/2003 | Douglas et al. | |
| 2003/0132854 A1 | 7/2003 | Swan et al. | |
| 2003/0132855 A1 | 7/2003 | Swan et al. | |
| 2003/0193433 A1 | 10/2003 | Carson | |

OTHER PUBLICATIONS www.apstechnology.com Nov. 1, 2003.
www.comtainertrac.com Nov. 1, 2003.
www.nascent.com Nov. 1, 2003.
www.nowsol.com Nov. 1, 2003.
www.saic.com Nov. 1, 2003.
www.savcor.com Nov. 1, 2003.
Website from Sattel USA, Inc; Nov. 1, 2003.

* cited by examiner

*Primary Examiner*—Hung T. Nguyen
(74) *Attorney, Agent, or Firm*—GSS Lawgroup; Earle Jennings

(57) ABSTRACT

A mechanism and method for making status reporting devices for container handlers, including: providing a micro-controller module, and installing a program system into memory accessed by a computer directing the micro-controller module. The micro-controller module communicatively couples with means for wirelessly communicating and for sensing a state of the container handler. Means for wirelessly communicating may include means for wirelessly determining container handler location. The micro-controller module may be communicatively coupled to a separate means for determining location. An apparatus making the devices may include a second program system directing the invention's method through a second computer, which may control an assembly device in creating the micro-controller, coupled with the means for sensing and for wirelessly communicating.

99 Claims, 31 Drawing Sheets

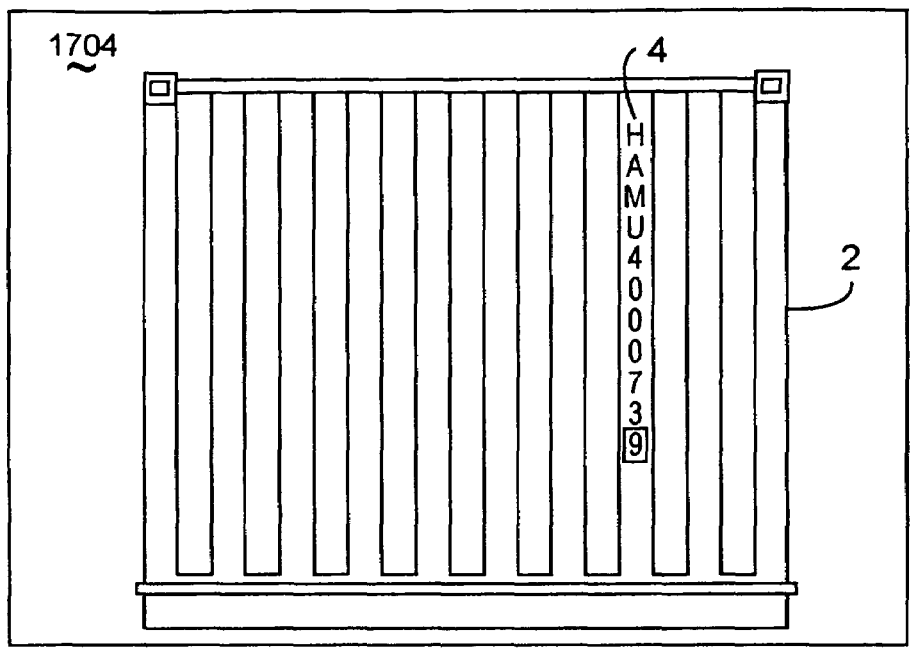
Fig. 11A
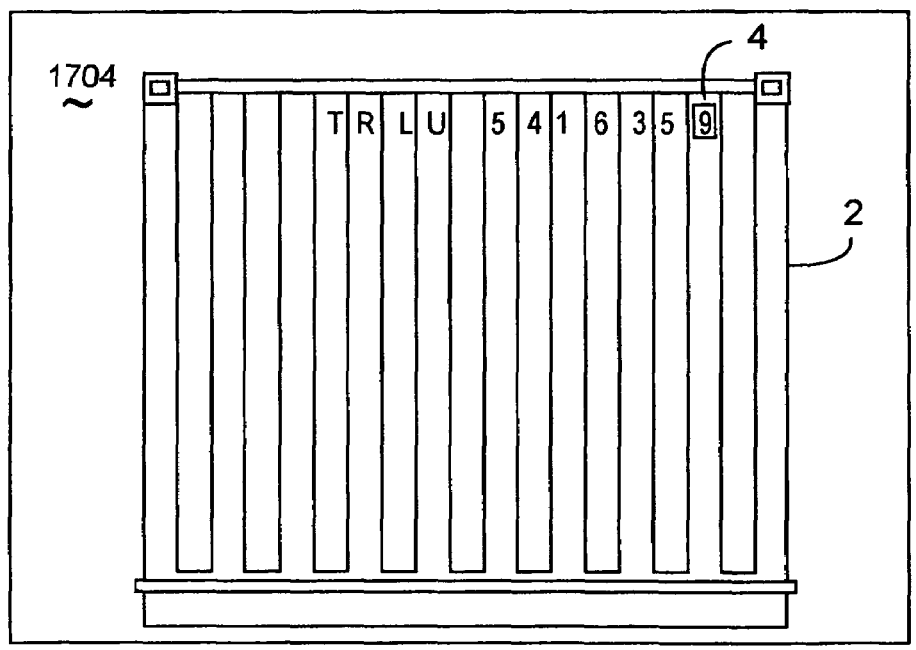
Fig. 11B
TRLU541650
Fig. 11C

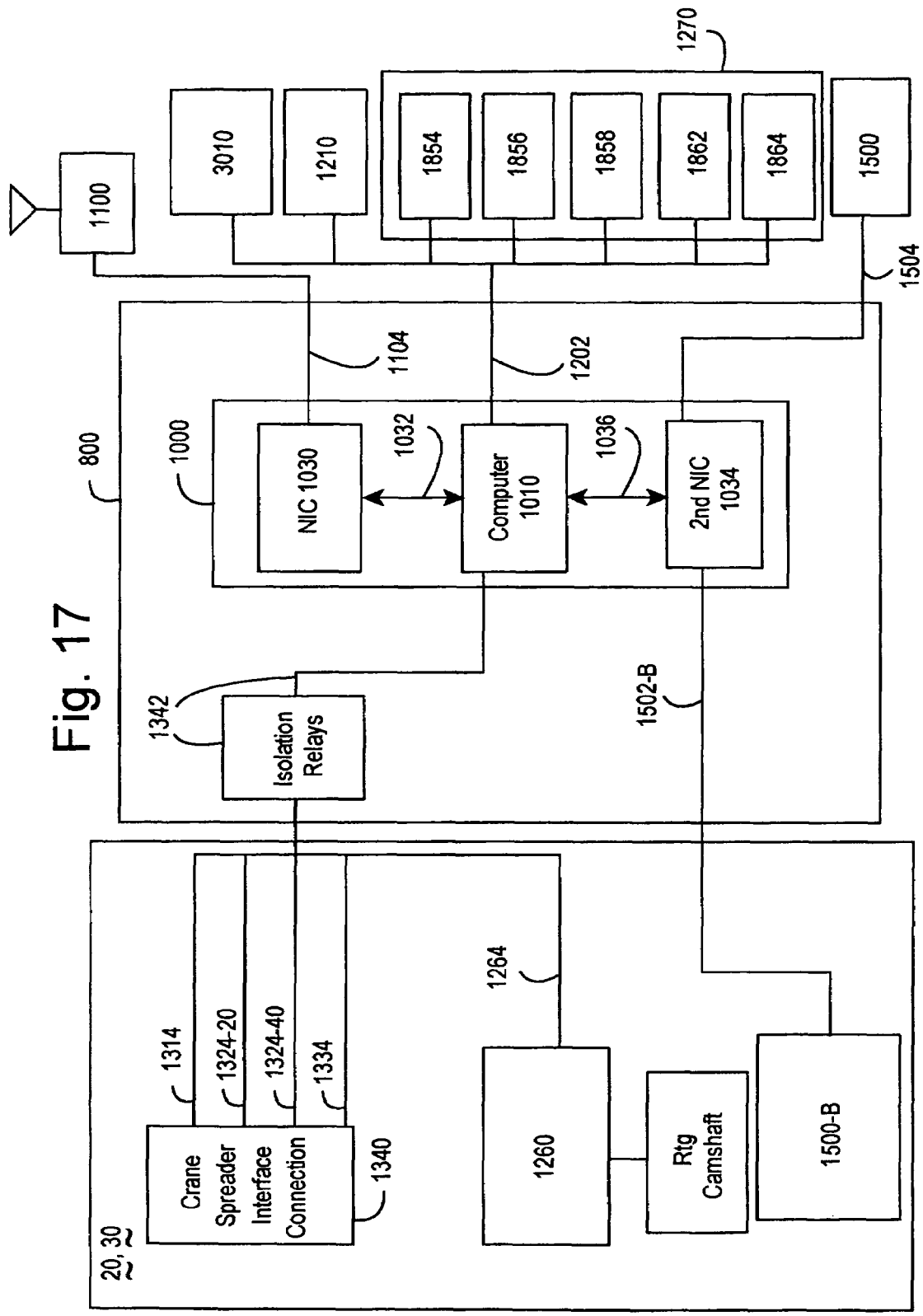

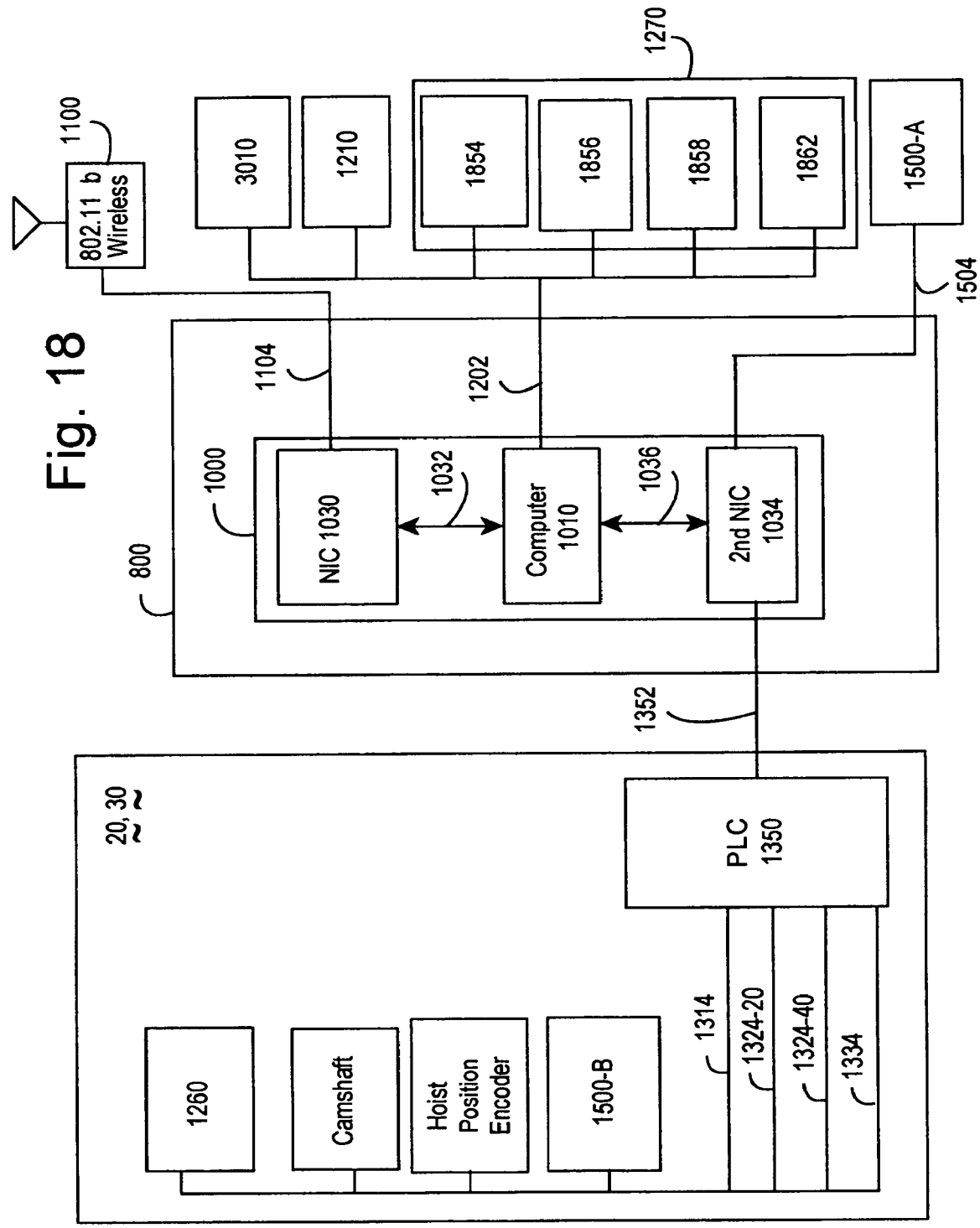

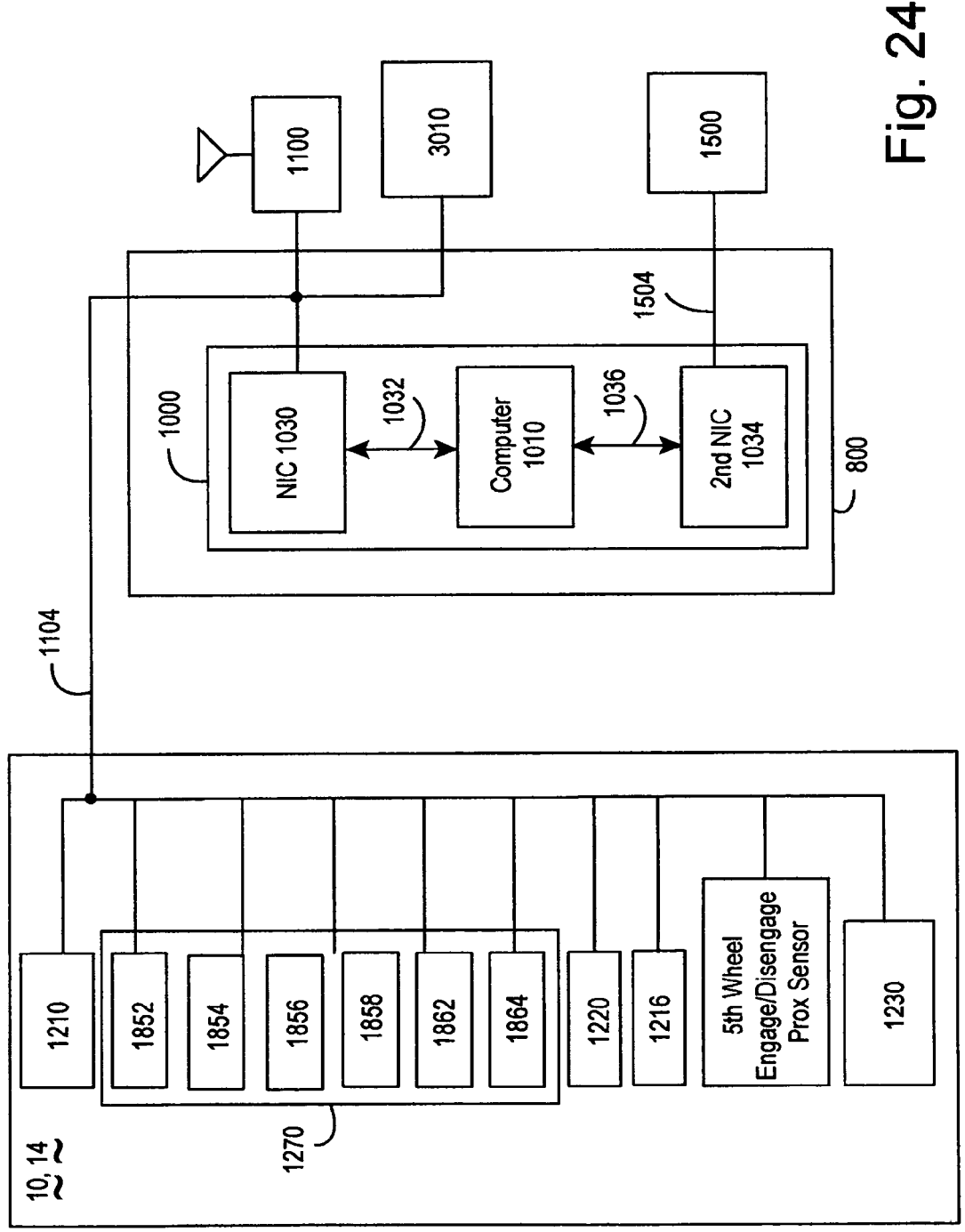

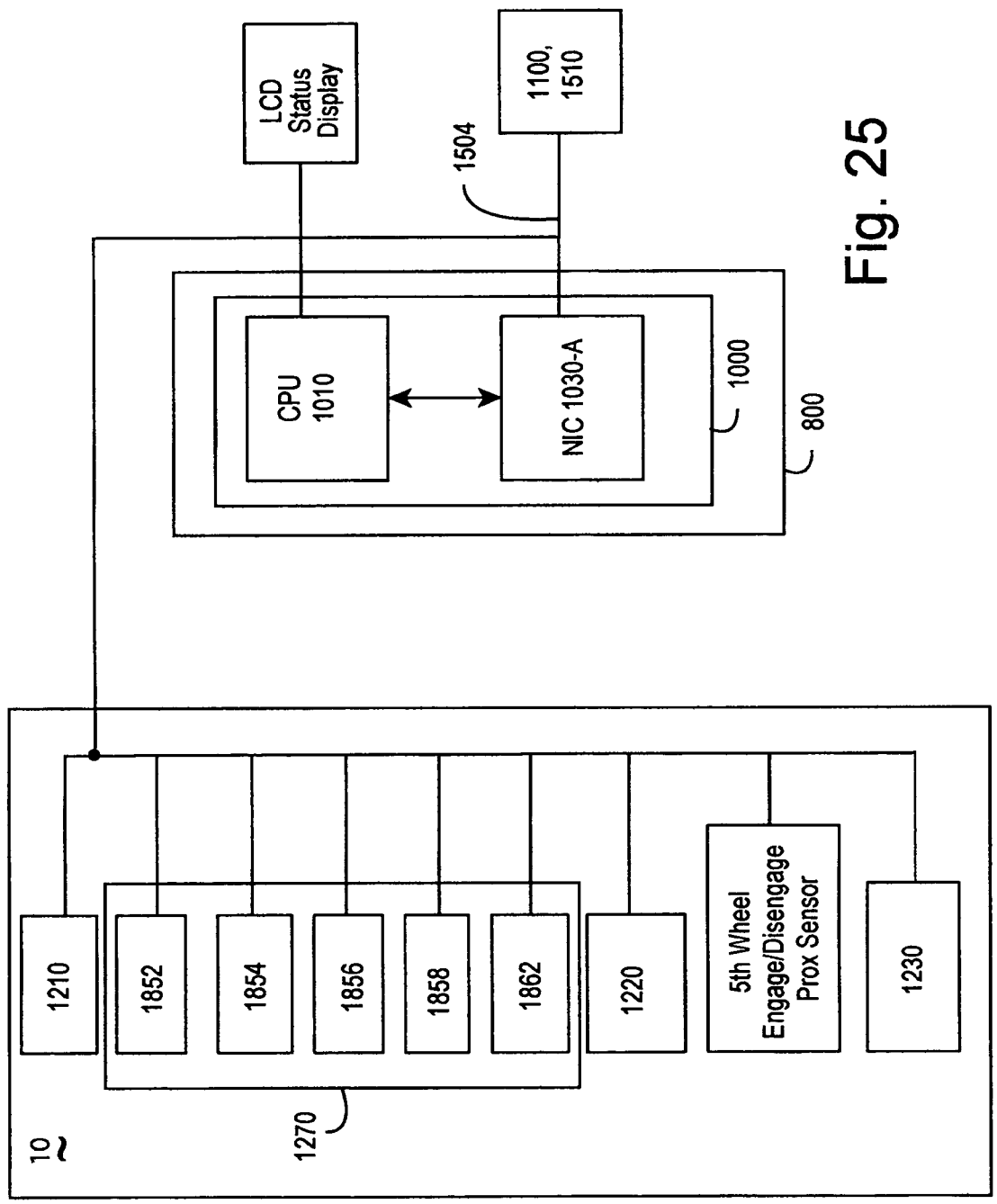

METHOD AND APPARATUS FOR MAKING STATUS REPORTING DEVICES FOR CONTAINER HANDLERS

CROSS REFERENCES TO PRIORITY DOCUMENTS

This application claims the benefit of the priority date of provisional patent application Ser. No. 60/571,009 filed May 14, 2004.

BACKGROUND OF THE INVENTION

1. Field of the Invention

The present invention relates to status reporting devices for container handlers and methods of making these devices. A container handler will refer herein to a device, usually operated by a human operator, which moves a container of at least twenty feet in length.

2. Background Information

Container terminals are transfer points between marine and land-based shipping. These container terminals must maintain inventory control for an ever-increasing number of containers. The basic unit of transfer is a container, which comes in five sizes, a ten foot, a twenty foot, a thirty foot, a forty foot and a forty five foot size. These containers, when filled, may weigh up to 110,000 pounds, or 50,000 kilograms, making them impossible to move, except by machinery.

The last few years have seen increased demand for real-time reporting of container activity throughout the container terminals.

The point of transfer between marine transport and land-based transport is the quay side crane, or quay cranes, as they will be known hereafter. Berthing operations involve transferring containers between a container ship and a land transport by one of these quay cranes. There is often a need for mechanisms to inspect the containers and/or create long lasting records of the visual condition of the containers at the time of transfer. The clerks involved may intentionally or unintentionally mislead the container inventory management system and the terminal management. The container's contents may be damaged when it reaches its destination, leading to the possibility of lawsuits and insurance claims being brought against terminal management. Berthing operations may be seen as loading and unloading containers onto container ships.

The quay cranes deliver the containers onto UTR trucks, which sometimes carry the containers on specialized chassis known as bomb carts. The UTR trucks move containers around a terminal, transferring the containers between one or more stacking yards and the Quay cranes. In the stacking yards, a number of different cranes may be used to place the container in stacks, or possibly load them onto or unload them from trucks used for container movement outside the terminal.

There is an ever growing need to continuously monitor the status of the container handlers around a terminal. Overall terminal efficiency tends to be improved if the terminal management knows the status and/or location of each container handler and each container in the terminal. Illicit use of container handlers may be minimized by use of operator identification devices. The container codes may be observed and recorded at various points in the terminal transfer operations. Photographs may be taken of the container conditions as it is leaving a ship, or being put on a ship.

There is however a problem of scale. While there are millions of containers entering and leaving a country such as the United States annually, there are nowhere near that many container handlers. Even worse, there are many different kinds of container handlers.

Some, such as UTR trucks, Front End Loaders (FEL), and bomb carts handle containers differently from the cranes. As used herein, Front End Loaders will refer to Top Handlers (also known as Top Loaders) and Side Handlers (also known as Side Pickers). The crane based container handlers vary in structure greatly. Some have centralized controls, known as Programmable Logic Controllers (PLC), and some do not. As a consequence, these reporting devices, which enable container tracking, represent small production runs. These small production runs involve many variations in circuitry and couplings for these different types of container handlers, with the attendant high setup and manufacturing costs. A modular manufacturing method is needed for these reporting devices, which can readily account for the container handler variations, while minimizing cost and maximizing reliability.

In the last few years, a variety of radio frequency tagging devices have entered the marketplace. These devices can often provide a mechanism for identifying themselves, as well as reporting their location via a wireless communication protocol, often one or more variants IEEE 802.11. Some of these devices rely on a local wireless network to aid them in location determination. While these devices have uses, they do not satisfy all the needs that container handlers have for status reporting. What is needed are mechanisms and methods for using the capabilities of radio frequency tagging devices to provide an integrated solution to the needs of the various container handlers, to report on the container handler status, and/or provide observations of the container being handled.

BRIEF SUMMARY OF THE INVENTION

The invention includes a mechanism and a method for making status reporting devices for container handlers. The devices are manufactured in a modular, highly efficient manner, which is able to use a relatively small number of different parts to serve the needs of a wide variety of container handlers.

A container handler will refer herein to a device, usually operated by a human operator, which can move a container of at least twenty feet in length. International commerce primarily uses containers of approximately ten feet, twenty feet, thirty feet, forty feet or forty-five feet in length.

The method making the status reporting devices includes the following steps. A micro-controller module is provided. A program system is installed into a memory, which a computer can access to direct the micro-controller module.

The micro-controller module is communicatively coupled with a means for wirelessly communicating and a means for sensing a state of the container handler.

The program system includes program steps residing in the memory. These program steps include the following. Using the means for sensing the state of the container handler to create a sensed state. And using the wirelessly communicating means to communicate the sensed state of the container handler.

In many preferred applications of the status reporting device, the means for wirelessly communicating is linked to a container inventory management system, sometimes also known as a terminal operating system. The sensed state may be preferably communicated to another computer, preferably associated with the terminal operating system.

The means for sensing may include, but is not limited to, means for any combination of the following.

Sensing an operator identity.

Sensing a container presence on, or coupled to, the container handler.

Optically sensing a container code on a container.

Radio frequency sensing a radio frequency tag on the container.

Sensing a stack height for the container.

Sensing at least one member of a machine state list of the container handler. The machine state list may include reverse motion, frequent stops count, collisions, fuel level, and compass readings. The machine state list may further include a wind speed and an equipment up-time.

Sensing at least one member of a crane state list. The crane state list may include a twistlock sensed state, a spreader sensed state, a sensed landing state, a trolley position, and a hoist height.

Sensing the container size.

Sensing the container weight.

Sensing container damage.

The means for wirelessly communicating may include a means for wirelessly determining the location of the container handler. Alternatively, the micro-controller module may be communicatively coupled to an at least partially separate means for locating the container handler. The means for locating may include an interface to a Global Positioning System (GPS). The means for wirelessly communicating may include a radio location-tag unit.

The container handler is at least one member of a container handler list comprising an UTR truck, a bomb cart, a rubber tire gantry crane, a quay crane, a side picker, a top loader, a top handler, a reach-stacker, a straddle carrier, and a chassis rotator.

The memory may include a non-volatile memory, which may further contain at least part of at least one of the program steps of the invention. Installing the program system may include altering at least part of the non-volatile memory, or installing a memory module containing at least part of at least one of the program steps in the non-volatile memory, creating at least part of the memory, which can be accessed by the computer. As used herein, the computer may be part of a micro-controller.

The invention includes apparatus for making the status reporting devices. The apparatus may include a second program system directing the implementation of the invention's method residing in memory accessibly coupled to a second computer. The second computer may control an assembly device receiving the micro-controller module, the means for wirelessly communicating, and the means for sensing the state of the container handler to create the reporting device.

BRIEF DESCRIPTION OF THE DRAWINGS

FIGS. 11A and 11B show example views of FIG. 10B, of the container code optically viewed on the side of container of FIGS. 1, 3A, and 4A;

FIG. 11C shows an example of the container code text of FIG. 10B;

FIGS. 17 to 20 show various embodiments of the status reporting device for the rubber tire gantry crane of FIG. 1 and the quay crane of FIG. 2;

FIGS. 24 and 25 shows various embodiments of the status reporting device for the UTR truck and/or bomb cart/chassis of FIG. 1.

DESCRIPTION OF THE PREFERRED EMBODIMENTS

The invention includes an apparatus and a method of making at least one, preferably many status reporting device 800 for at least one, preferably many container handler 78. The manufacturing proceeds in a modular, highly efficient manner, which is able to use a relatively small number of different parts to serve the needs of a wide variety of container handlers.

A container handler 78 will refer herein to a device, usually operated by a human operator, which moves a container 2 of at least twenty feet in length. International commerce primarily uses containers of approximately twenty feet to forty five feet in length. Containers when filled with cargo may weigh up to 110,000 pounds, or up to 50,000 kilograms. The width of the container 2 may be at least eight feet wide. The height of the container may be at least eight feet six inches.

Figure 4A:
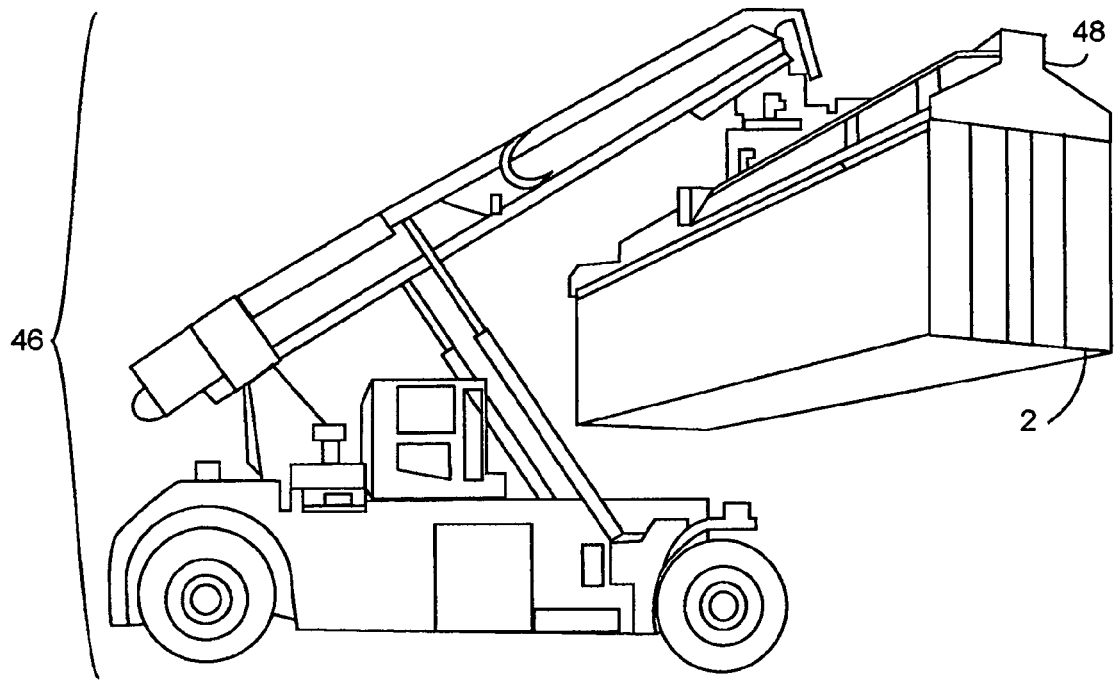
FIG. 4A shows another container handler referred to herein as a reach stacker.
Figure 4B:
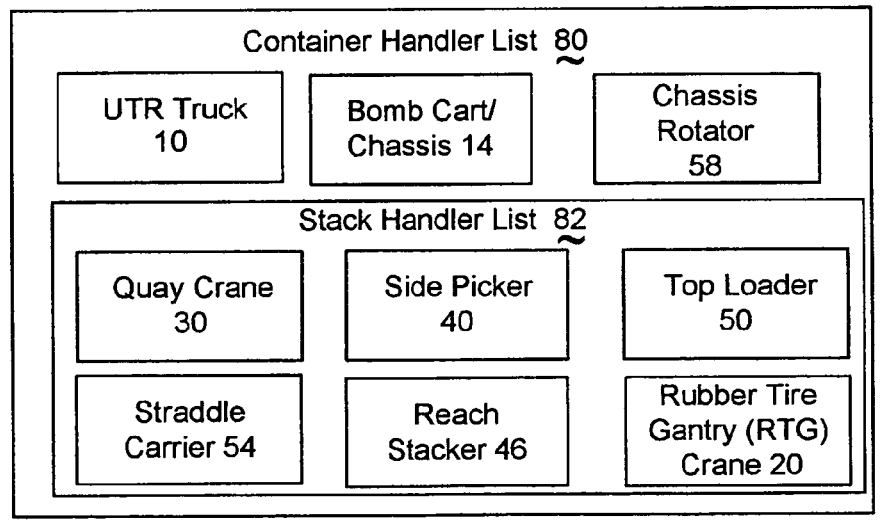
FIG. 4B shows the container handler list.

As used herein, a container handler 78 will refer to at least one of the members of the container handler list 80 shown in FIG. 4B. The container handler list 80 includes, but is not limited to, the following.

Figure 1:
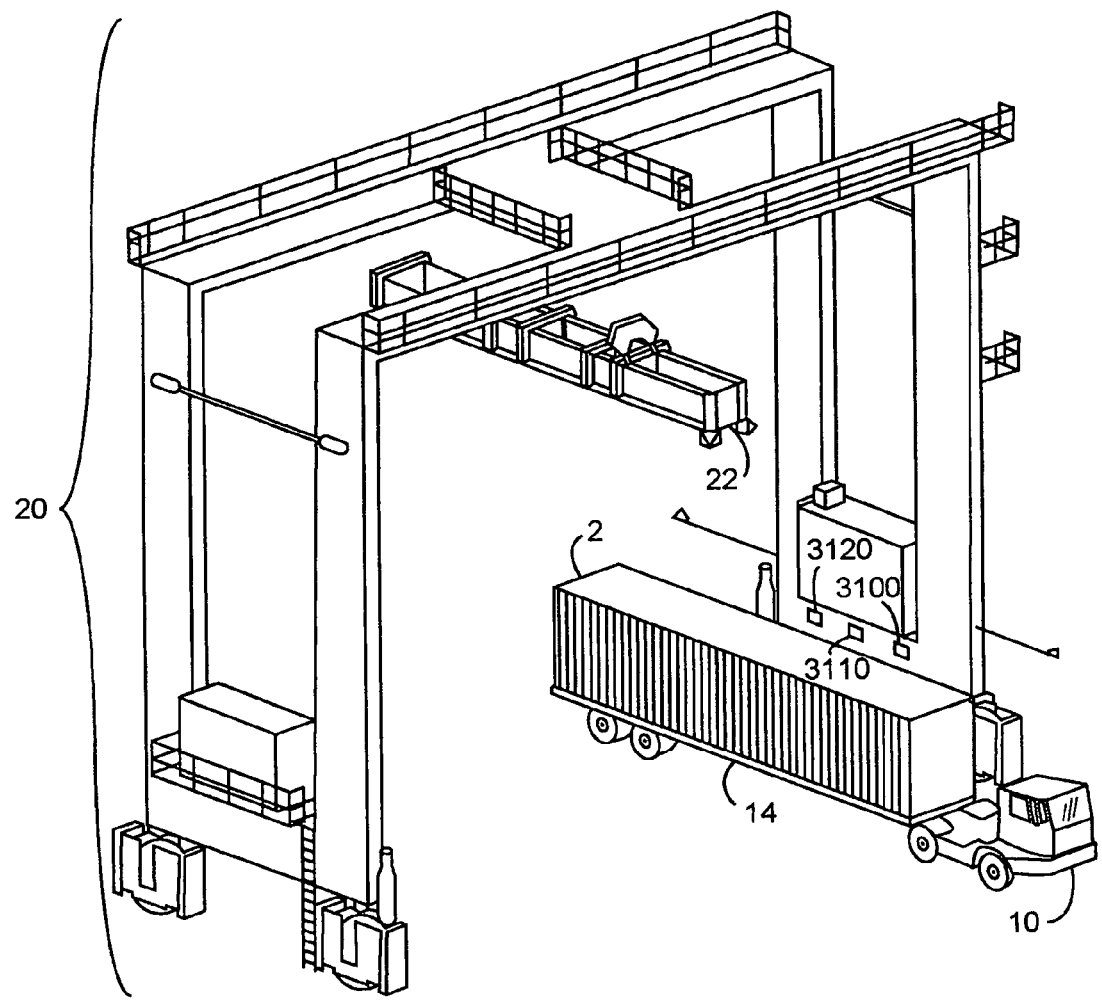
FIG. 1 shows three container handlers: a rubber tire gantry (RTG) crane and a UTR truck hauling a bomb cart.

The UTR truck 10, the bomb cart 14, and the Rubber Tire Gantry crane 20, often abbreviated RTG crane are shown in FIG. 1. Note that the bomb cart 14 is also known as a container chassis, when the container 2 is tied down. Within container terminals, containers are not typically tied down to bomb carts.

Figure 2:
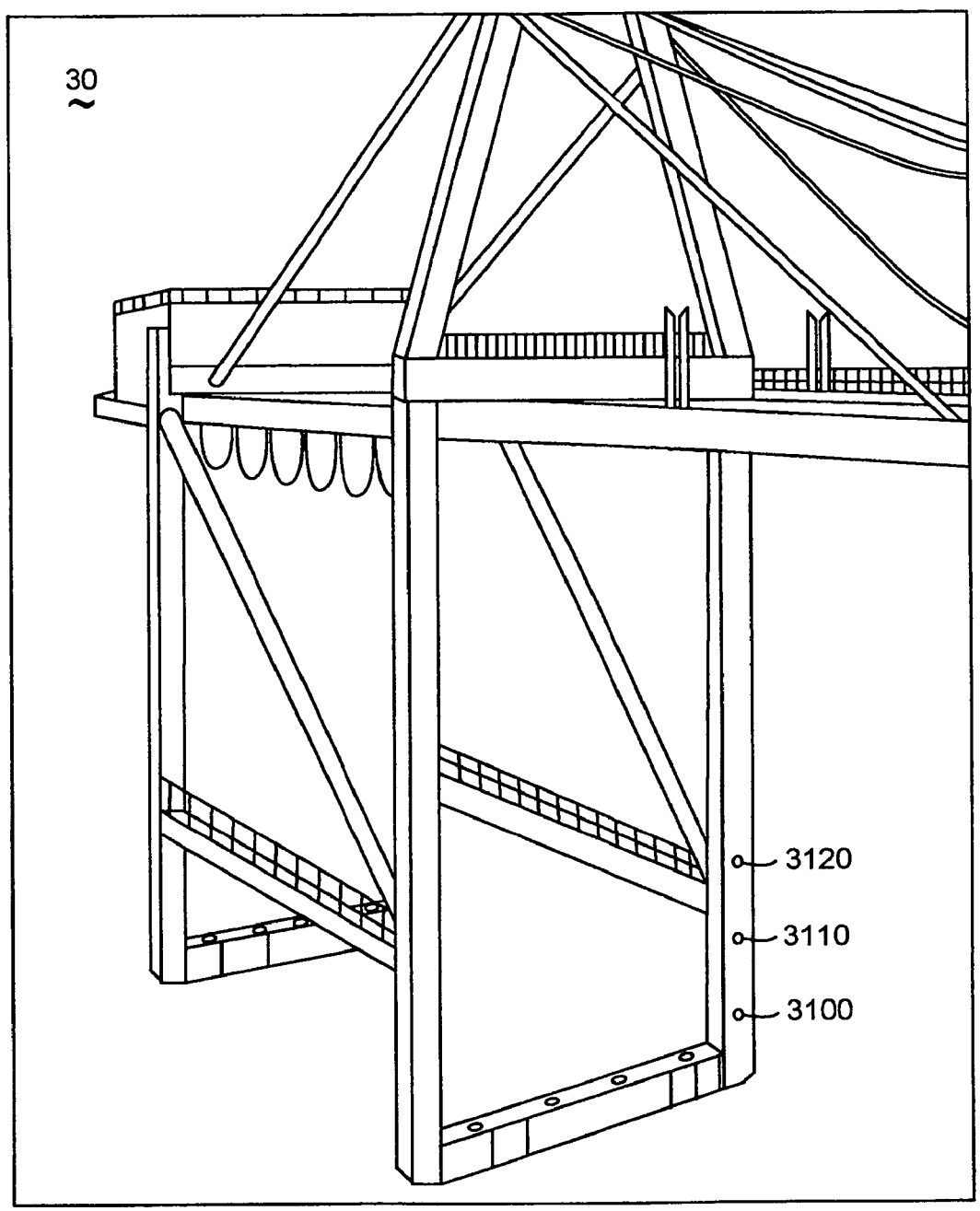
FIG. 2 shows another container handler referred to herein as a quay side crane.

The quay crane 30 is shown in FIG. 2.

Figure 3A:
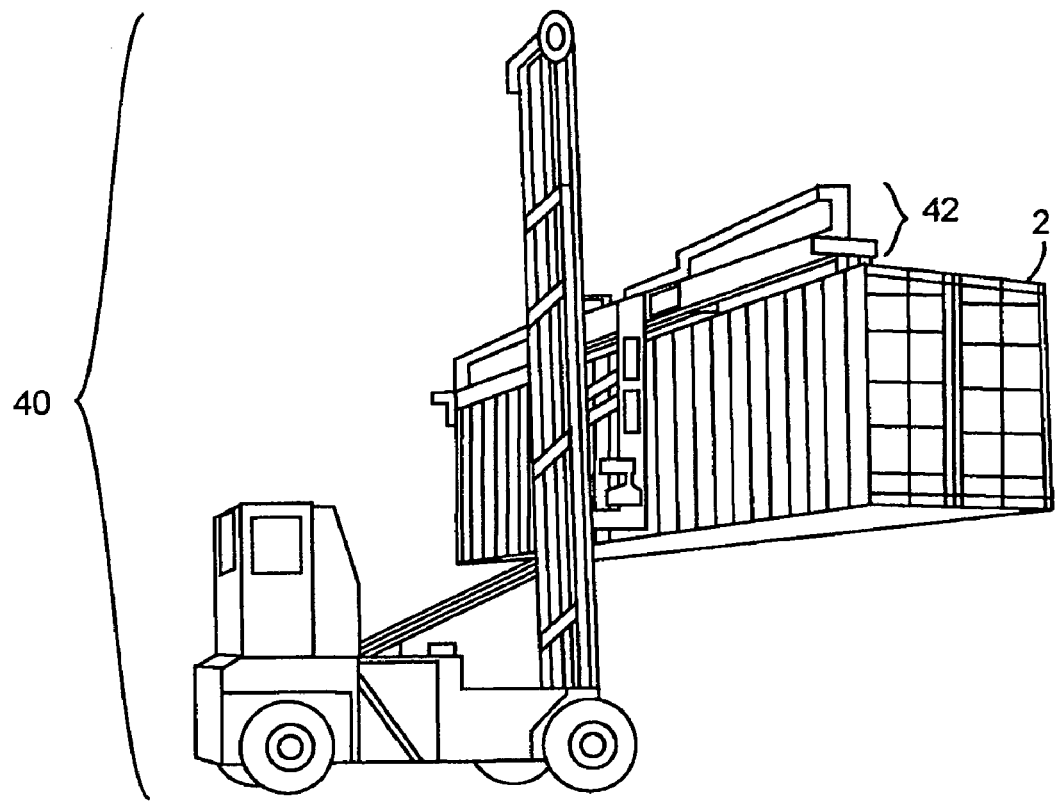
FIG. 3A shows another container handler referred to herein as a side picker.

The side picker 40 is shown in FIG. 3A.

The reach stacker 46 is shown in FIG. 4A.

Figure 4C:
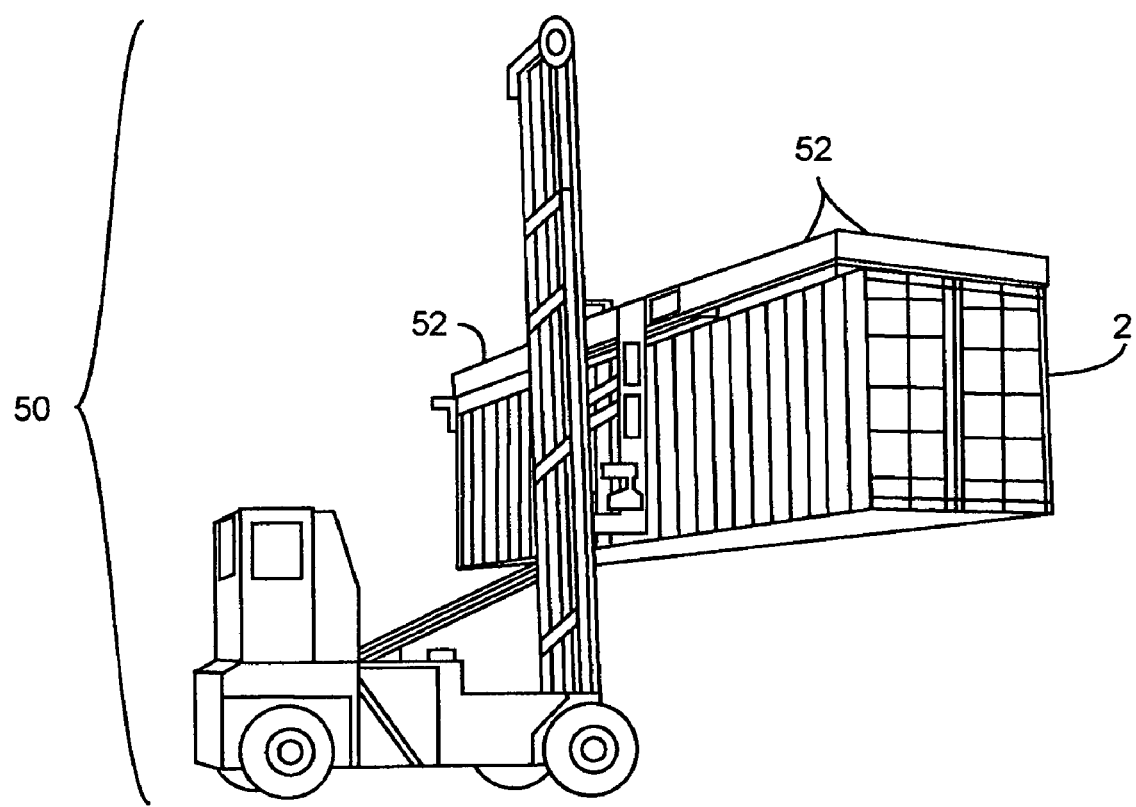
FIG. 4C shows a top handler.

The top handler 50 is shown in FIG. 4C.

Figure 4D:
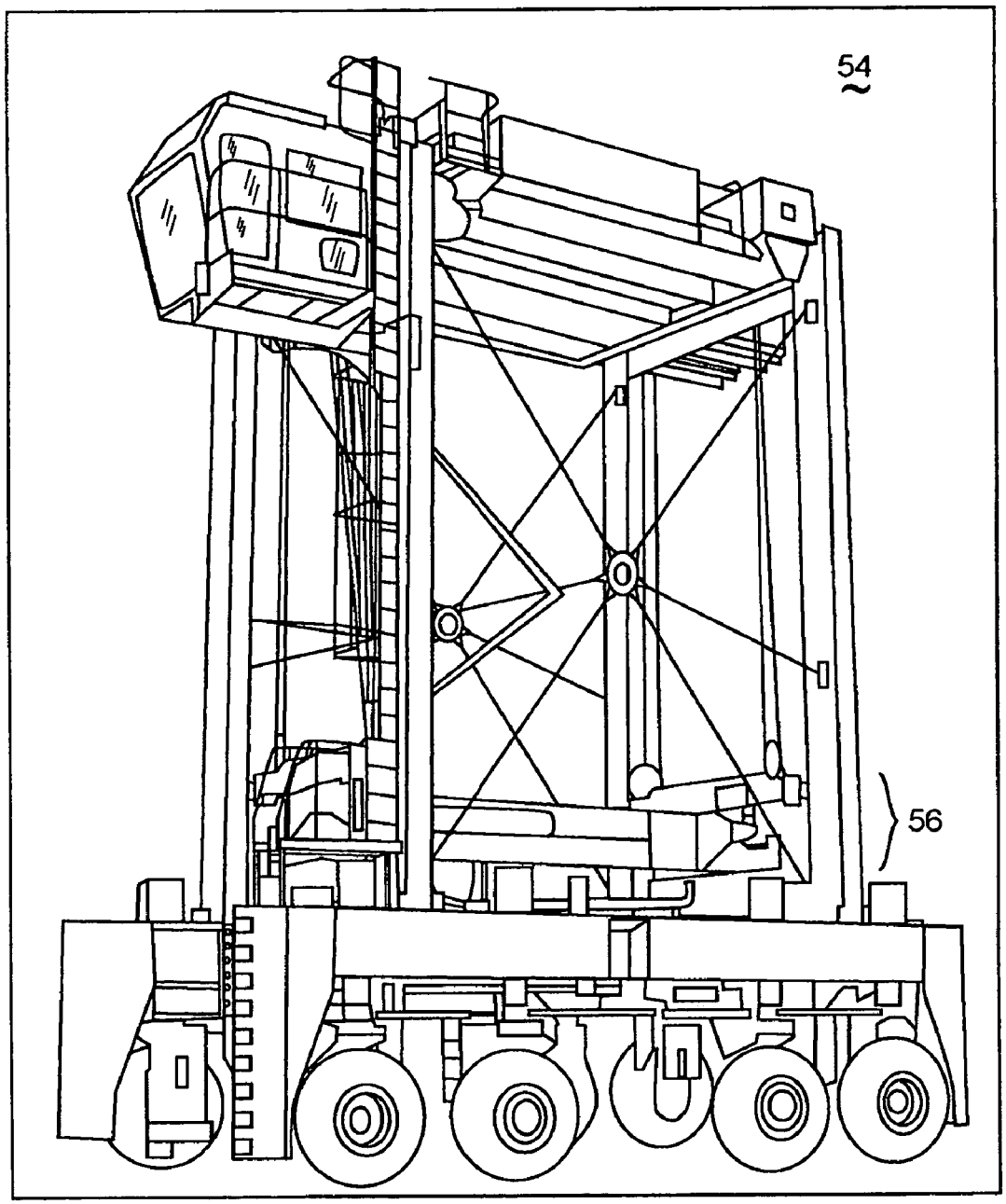
FIG. 4D shows a straddle carrier.

The straddle carrier 54 is shown in FIG. 4D.

The chassis rotator 58. The chassis rotator is used to rotate the chassis used to haul one or more containers. It operations and requirements are similar to other contain handlers, except that its rectilinear position is fixed. More relevant for these container handlers is the use of its location 1900 as an angular measure of its orientation of the container 2. The means for determining 1500 the location 1900 consequently may use a shaft encoding, possibly an optical shaft encoder.

The rubber tire gantry crane 20 of FIG. 1 may be called a transfer crane and/or a TRANSTAINER™. The quay crane 30 of FIG. 2 is sometimes referred to as a PORTAINER™. The side picker 40 of FIG. 3A is also referred to as a side handler or a side hauler. The top loader 50 of FIG. 4C is also referred to as a top picker or top handler.

Some of these container handlers have the ability to lift and/or place a container 2. A container handler 78 able to lift and/or place the container is a member of the stacking handler list of FIG. 4B, which includes, but is not limited to, the following.

The rubber tire gantry 20 of FIG. 1 includes a rubber tire gantry spreader 22.

The quay crane 30 of FIG. 2 includes a quay crane spreader, which is outside the picture.

The side picker 40 of FIG. 3A includes a side picker spreader 42.

The reach stacker 46 of FIG. 4A includes a reach stacker spreader 48.

The top handler 50 of FIG. 4C includes a top handler spreader 52.

The straddle carrier 54 of FIG. 4D includes a straddle carrier spreader 56.

Figure 3B:
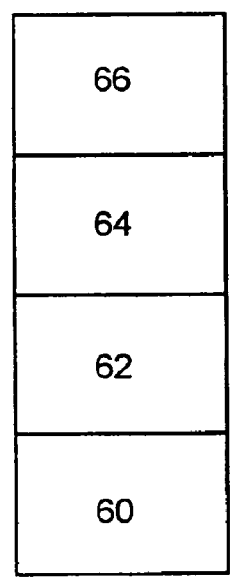
FIG. 3B shows a stack of containers defining what is referred to herein as a stacking height.

FIG. 3B shows a stack of containers including first container 60 to fourth container 66 defining what is referred to herein as a stacking height.

The stacking height of the first container 60 is usually denoted as one.

The stacking height of the second container 62 is two.

The stacking height of the third container 64 is three.

And the stacking height of the fourth container 66 is four.

While this is a standard designation, any other designation may be used within a computer, such as numbering as follows, first container 60 as zero, second container 62 as one, third container 64 as two, and fourth container 66 as three.

In some situations, container stacks may preferably include more than four container stacked on top of each other, for example, up to seven containers high.

Figure 5A:
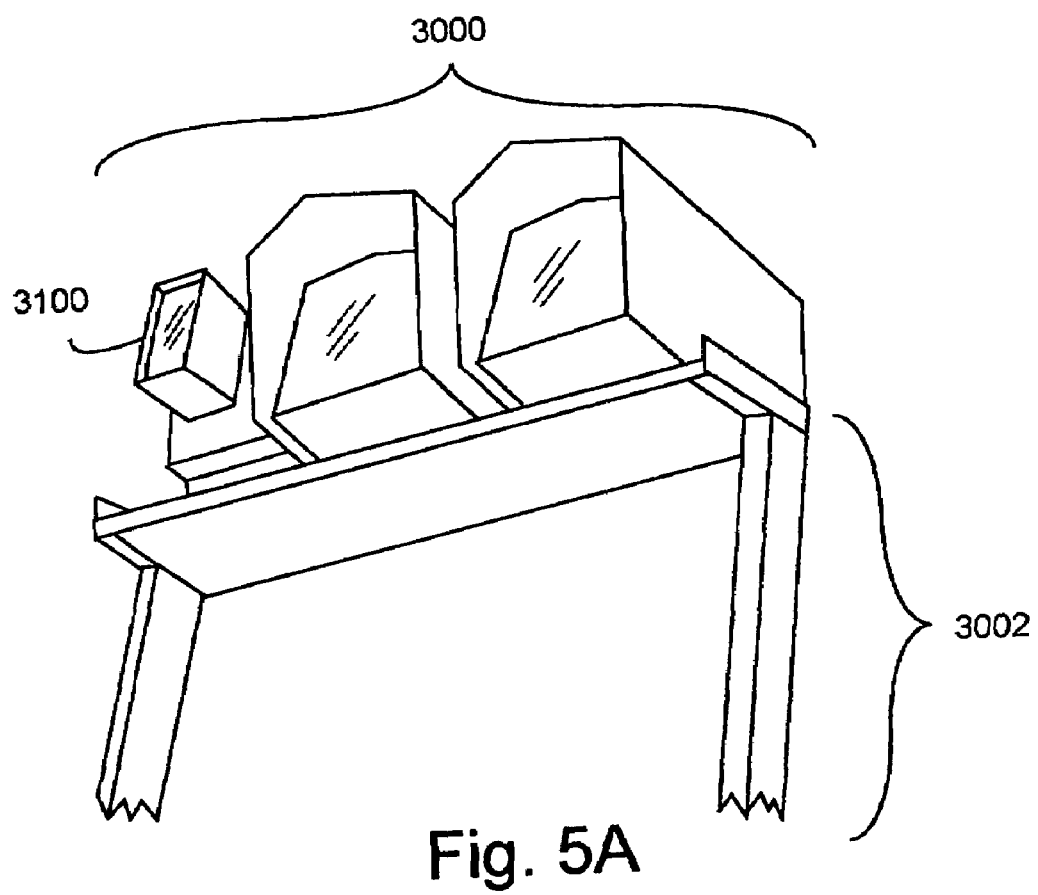
FIGS. 5A and 5B show housing of the status reporting device and sensors for use on various container handlers.
Figure 5B:
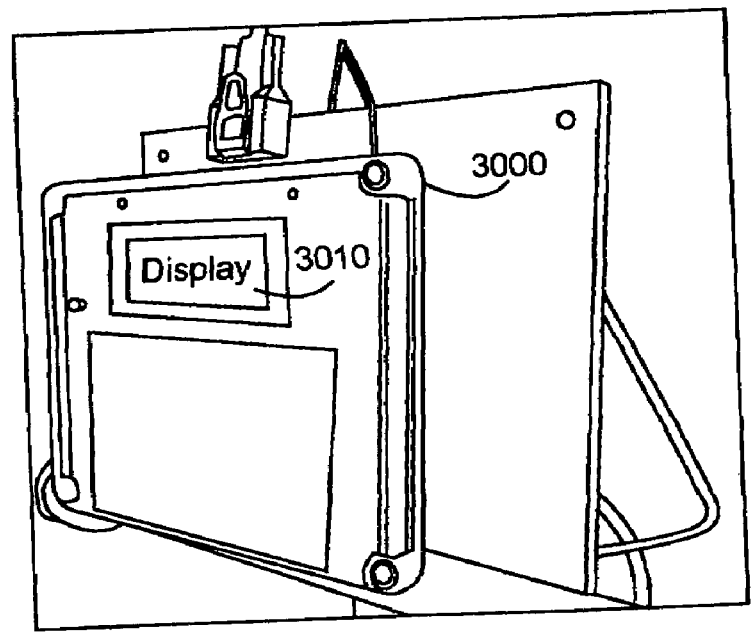

FIGS. 5A and 5B show two examples of a housing 3000 of the status reporting device 800 for use on various members of the container handler list 80.

The housing 3000 of FIG. 5A includes a housing mount 3002, by which it may be preferably attached to a rubber tire gantry crane 20 of FIG. 1 and/or quay crane 30 of FIG. 2. The housing 3000 may preferably contain at least part of the means for optical container code sensing 1230.

The housing 3000 of FIG. 5B preferably includes a display 3010. The housing 3000 may preferably be attached to any member of the container handler list 80.

Figure 6A:
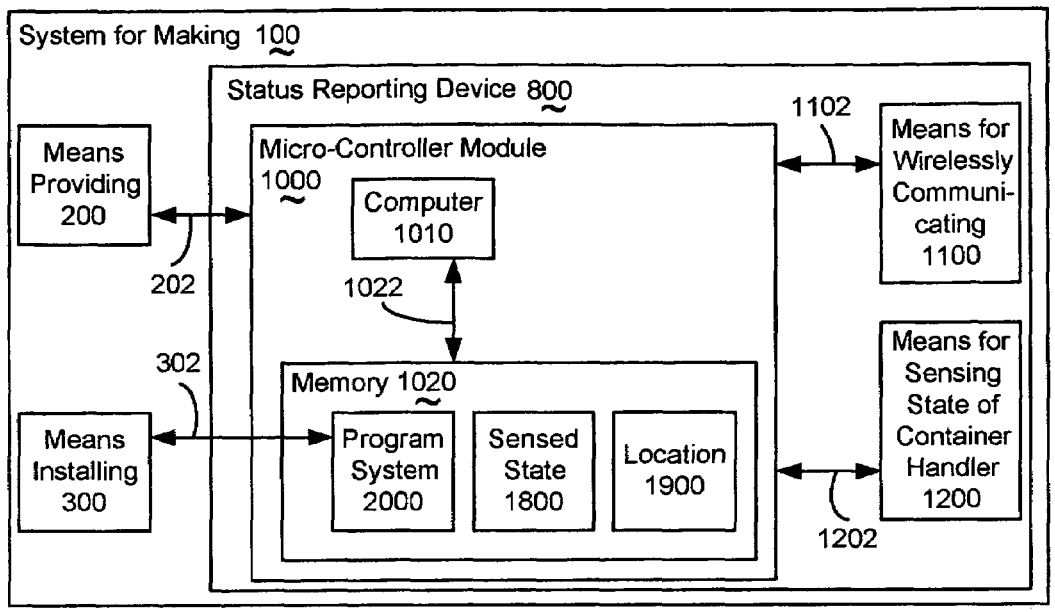
FIG. 6A shows a system for making a status reporting device for the container handlers of FIGS. 1, 2, 3A, 4A, and 4B.
Figure 13A:
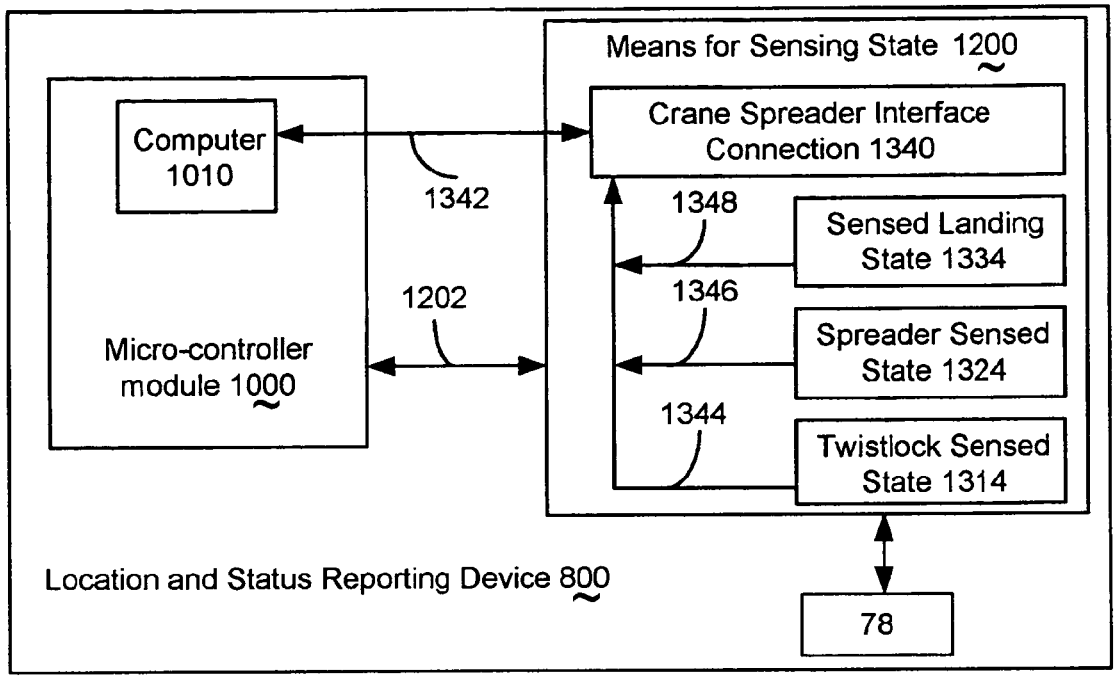
FIG. 13A shows a refinement of the status reporting device 800 of FIGS. 6A and 7A where the sensing means includes coupling to a crane spreader interface connection.
Figure 13B:
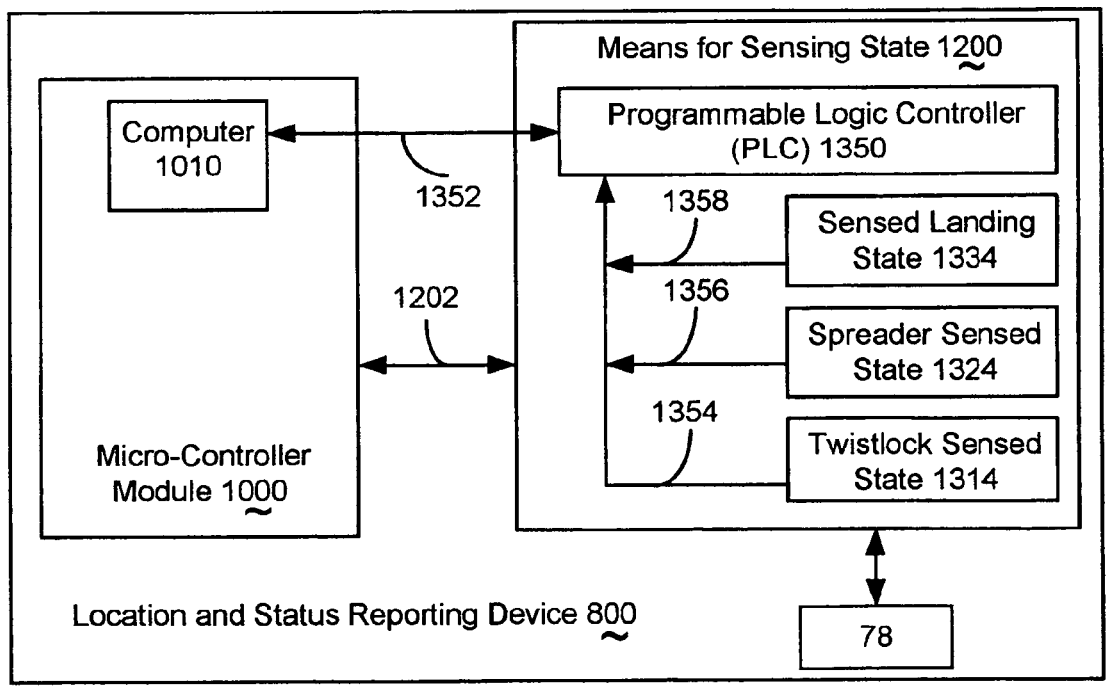
FIG. 13B shows a refinement of the status reporting device of FIGS. 6A and 7A where the sensing means includes coupling to a Programmable Logic Controller (PLC)

FIG. 6A shows a system for making 100 a status reporting device 800 for a container handler 78 of FIGS. 13A and 13B. The container handler 78 is a member of the container handler list 80. Some preferred embodiments of the status reporting device 800 for specific members of the container handler list 80 are shown in FIGS. 17 to 25.

In FIG. 6A, the system for making 100 includes a means for providing 200 a micro-controller module 1000.

The status reporting device 800 includes a first communicative coupling 1102 of the micro-controller module 1000 with a means for wirelessly communicating 1100. and The status reporting device 800 includes a second communicative coupling 1202 of the micro-controller module 1000 with a means for sensing state 1200 of at least one member of the container handler list 80 of FIG. 4B.

In FIG. 6A, the system for making 100 also includes means for installing 300 a program system 2000. The program system 2000 is installed into 302 a memory 1020.

The micro-controller module 1000 includes an accessible coupling 1022 of a computer 1010 with the memory 1020.

Figure 16A:
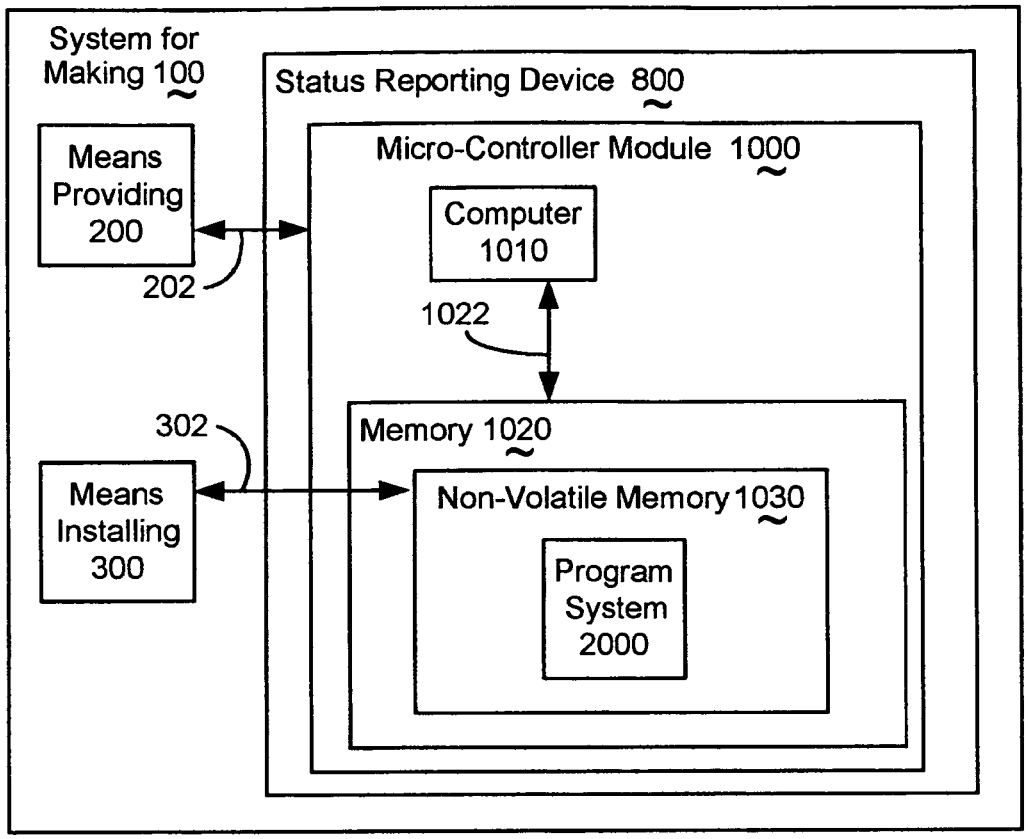
FIG. 16A shows the memory of FIG. 6A including a non-volatile memory.

The computer 1010 directs the activities of the micro-controller module 1000 through a program system 2000. The program system 2000 includes program steps residing in the memory 1020 as shown in FIGS. 6A and 16A.

The method of operating the status reporting device 800 will be discussed as implemented by the program system 2000. One skilled in the art will recognize that alternative implementations, which may include, but are not limited to, finite state machines, neural networks, and/or inferential engines are possible, feasible, and in certain circumstances, potentially preferable.

A computer as used herein may include, but is not limited to, an instruction processor and/or a finite state machine, and/or an inferential engine, and/or a neural network. The instruction processor includes at least one instruction processing element and at least one data processing element, each data processing element controlled by at least one instruction processing element.

An embodiment of the computer, as used herein, may include not only what some would consider peripheral circuitry, which may include, but is not limited to, communications circuitry, memory, memory interface circuitry, clocking and timing circuitry, as well as signal protocol interface circuitry.

These circuits may be fabricated in the same package as the computer, sometimes on the same semiconductor substrate as the computer.

While some of these circuits may be discussed separately from the computer, this is done to clarify the operation of the invention and is not meant to limit the scope of the claims to mechanically distinct circuit components.

Embodiments of the status reporting device 800 may include determining the location 1900 of a container handler as shown in FIG. 6A.

These aspects will be discussed later regarding the means for determining 1500 the location 1900 of the container handler as in FIGS. 14A to 14C, 15B, 17, 18, 21, 22, and 24.

Other alternatives may include, but are not limited to, using a means for wirelessly communicating 1100 which includes a means for wirelessly determining 1510 for locating the container handler, as discussed in FIGS. 15A, 19, 20, 23, and 25. These aspects of the invention may not require the storage of the location 1900 in the computer 1010 of FIG. 6A.

Some of the following figures show flowcharts of at least one method of the invention, possessing arrows with reference numbers. These arrows will signify of flow of control and sometimes data supporting implementations including at least one program operation or program thread executing upon a computer, at least one inferential link in an inferential engine, at least one state transitions in a finite state machine, and/or at least one dominant learned response within a neural network.

The operation of starting a flowchart is designated by an oval with the text "Start" in it, and refers to at least one of the following.

Entering a subroutine in a macro instruction sequence in a computer.

Entering into a deeper node of an inferential graph.

Directing a state transition in a finite state machine, possibly while pushing a return state.

And triggering a list of neurons in a neural network.

The operation of termination in a flowchart is designated by an oval with the text "Exit" in it, and refers to the completion of those operations, which may result in at least one of the following:

return from a subroutine return, traversal of a higher node in an inferential graph, popping of a previously stored state in a finite state machine, and/or return to dormancy of the firing neurons of the neural network.

Figure 6B:
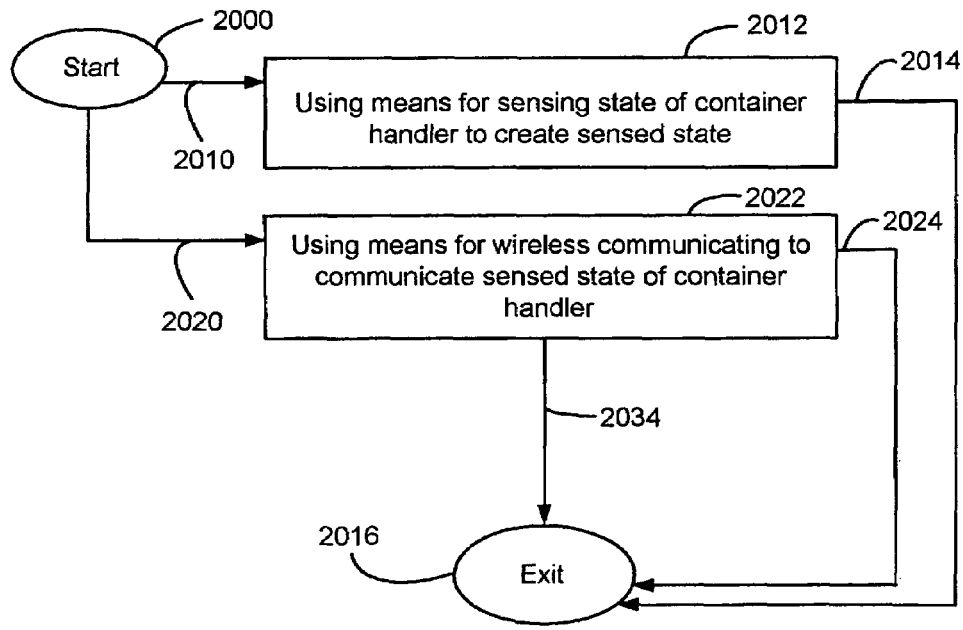
FIG. 6B shows a flowchart of the program system in the status reporting device of FIG. 6A.

FIG. 6B shows the program system 2000 of FIG. 6A, which the means for installing 300 installed into 302 the memory 1020.

Operation 2012 supports using the means for sensing state 1200 of FIG. 6A for sensing the state of the container handler 78 of FIGS. 13A and/or 13B, to create a sensed state 1800.

Operation 2022 supports using the means for wirelessly communicating 1100 to communicate the sensed state 1800 of the container handler 78.

One skilled in the art will recognize that the means for sensing state 1200 may further preferably include specific sensors and interfaces beyond those related with FIGS. 13A and/or 13B.

FIGS. 17 to 25 outline some variations of sensors, instrumentation and interfaces which may be preferred for various types of the container handler 78, which are members of the container handler list 80 of FIG. 4B.

Because of the complexity of FIGS. 17 to 25, the label 1200 will not be found in the drawings, but will be called out in their discussion.

Figure 7A:
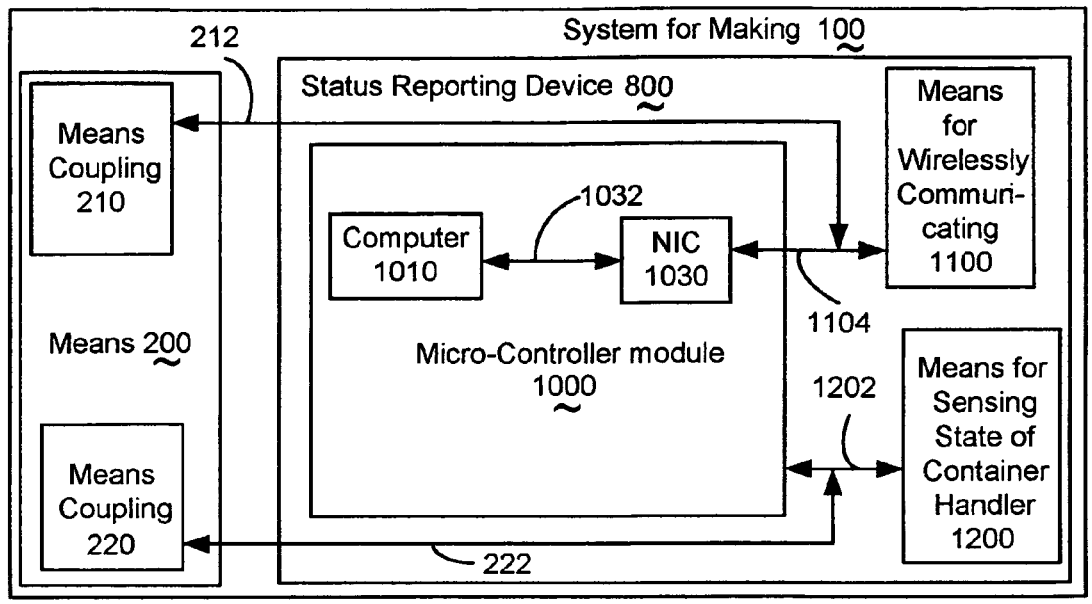
FIG. 7A shows a refinement of the status reporting system of FIG. 6A coupled by a Network Interface Circuit (NIC) to the means for wirelessly communicating.

FIG. 7A shows a refinement of the status reporting device 800 of FIG. 6A. The micro-controller module 1000 further includes a computer communicative coupling 1032 of the computer 1010 with a Network Interface Circuit 1030, denoted as (NIC).

FIG. 7A also shows a refinement of the means for providing 200 the micro-controller module 1000. The means for providing 200 the micro-controller module 1000 further includes:

A means for coupling 210, which creates the coupling 212 of the network coupling 1104 of the network interface circuit 1030 with the means for wirelessly communicating 1100.

A means for sensor coupling 220, which creates the sensor coupling 222 of the sensor coupling the micro-controller module 1000 to 1202 the means for sensing state 1200 of the container handler. This mechanism and process is similar to the various embodiments of the means for coupling 210 which creates the coupling 212, which will be described in greater detail.

Figure 7B:
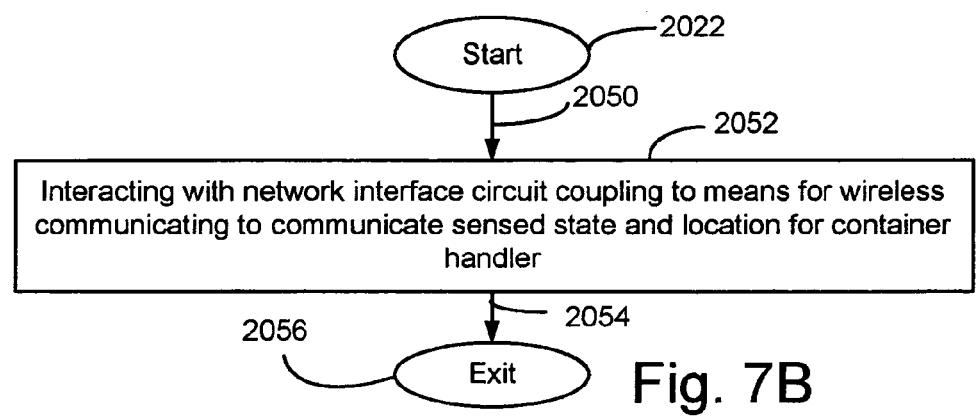
FIG. 7B shows a detail flowchart of FIG. 6B further using the means for wirelessly communicating.

FIG. 7B shows a detail flowchart of operation 2022 of FIG. 6B further using the means for wirelessly communicating 1100. Operation 2052 interacts via the computer communicative coupling 1032 with the network interface circuit 1030 via the network coupling 1104 with the means for wirelessly communicating 1100 to communicate the sensed state 1800 for the container handler.

Figure 7C:
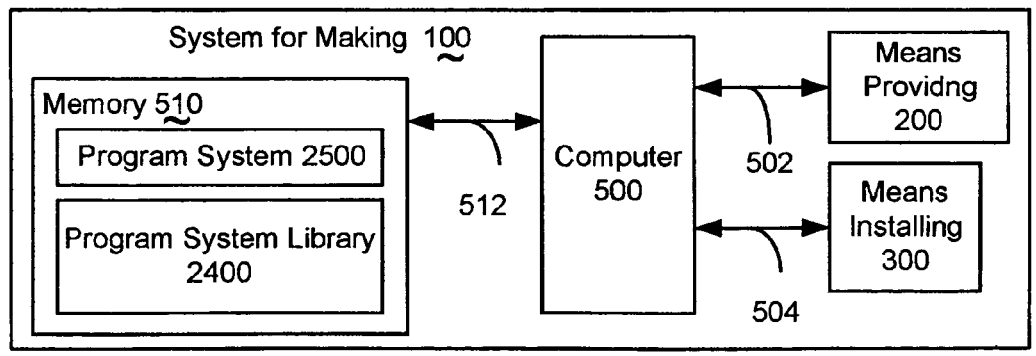
FIG. 7C shows a further, often preferred embodiment of the manufacturing system of FIGS. 6A and 7A, including a second computer at least partly directing the means for creating the status reporting device.

FIG. 7C shows a further, often preferred, embodiment of the system for making 100 the status reporting device 800 of FIGS. 6A and 7A.

The system for making 100 may include a second computer 500 at least partly directing the creation of the status reporting device 800.

The second computer 500 may at least partly first direct 502 the means for providing 200 the micro-controller module 1000.

The second computer 500 may at least partly second direct 504 the means for installing 300 the program system 2000.

The communications coupling between the second computer 500 with the means for providing 200 and the means for installing 300 may be a shared coupling, and the first direct 502 and the second direct 504 may use an addressing scheme for message or communications addressed to these means.

In FIG. 7C, the system for making 100 further includes the following.

A second accessible coupling 512 of the second computer 500 with a second memory 510.

A second program system 2500 includes program steps residing in the second memory 510.

The second computer 500 is at least partly controlled by the program steps of the second program system 2500, which are provided through the second accessible coupling 512 of the second memory 510.

The second program system 2500 may be considered to embody the method of manufacture, by directing the means for providing 200 and the means for installing 300 to create the status reporting device 800.

Figure 8A:
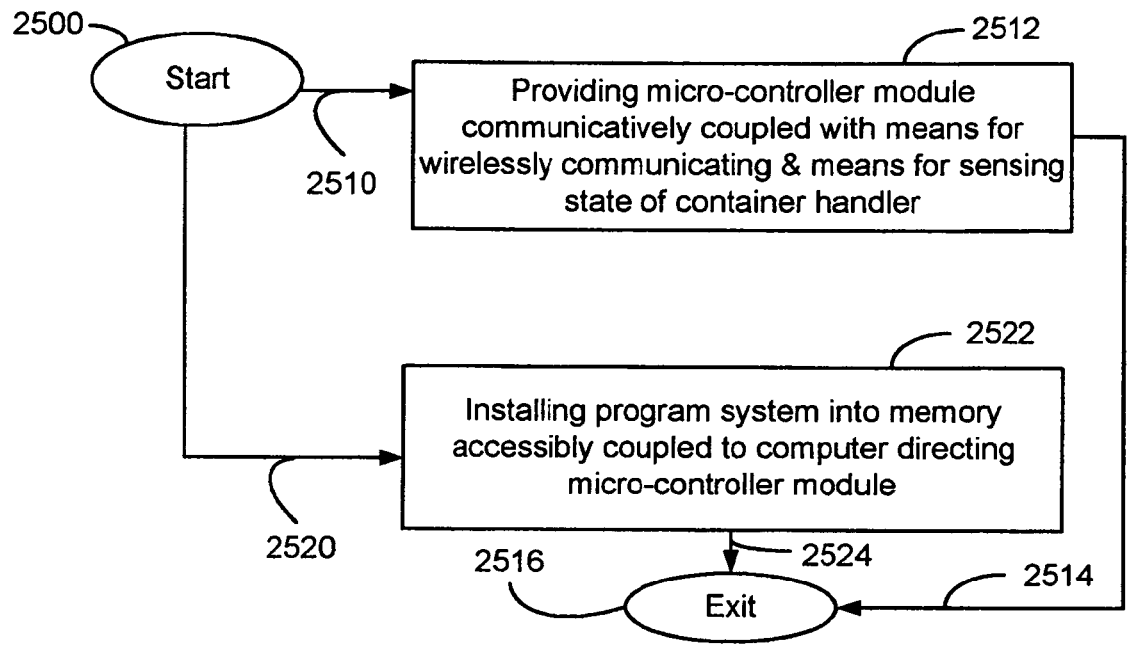
FIG. 8A shows a flowchart of the program system of FIG. 7C, embodying certain aspects of making the status reporting device of FIGS. 6A and 7A.

FIG. 8A shows a flowchart of the second program system 2500 of FIG. 7C, embodying certain aspects of the invention's method of making the status reporting device 800 of FIGS. 6A and 7A, which includes the following operations.

Operation 2512 directs the means for providing 200 to provide 202 the micro-controller module 1000 of FIGS. 6A and 7A.

Operation 2522 directs the means for installing 300 to install 302 the program system 2000 of FIGS. 6A, 7A, and 7B, into the memory 1020.

In FIG. 8A, the operation 2512 directing the means for providing 200 to provide 202 the micro-controller module 1000 of FIGS. 6A and 7A may involve the following in certain preferred embodiments.

The act of providing the micro-controller module 1000 may include, but is not limited to, fetching the module into an assembly work station, and/or positioning it for attachment to cables and test instruments.

The micro-controller module 1000 is provided with a first communicative coupling 1102 with the means for wirelessly communicating 1100.

The micro-controller module 1000 is also provided with a second communicative coupling 1202 to the means for sensing state 1200 for the container handler.

In FIG. 8A, the operation 2522 directing the means for installing 300 to install 302 the program system 2000 of FIGS. 6A, 7A, and 7B, into the memory 1020 may involve the following in certain preferred embodiments.

An accessible coupling 1022 of the memory 1020 and the computer 1010 supports the program system 2000 at least partly directing the computer 1010.

In certain preferred embodiments, the program system 2000 is installed 302 from a program system library 2400, as shown in FIG. 7C. The program system 2000 may be installed 302 using a wireline network interface circuit 1030, and/or using the means for wirelessly communicating 1100. The memory 1020 may preferably include at least one non-volatile memory component. The non-volatile memory component may preferably include a flash memory device. The installation may preferably include programming the flash memory component to install 302 the program system 2000.

The program system library 2400 may include multiple versions of the program system 2000, for use in controlling various embodiments of the status reporting device 800 created by the manufacturing process of the system for making 100.

Figure 8B:
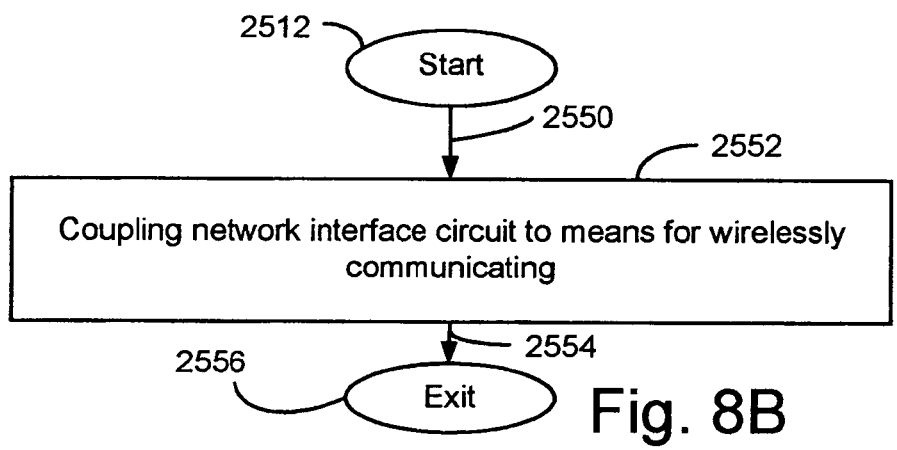
FIG. 8B shows a detail of FIG. 8A further providing the micro-controller module to the system of FIG. 6A.

FIG. 8B shows a detail of operation 2512 of FIG. 8A further providing the micro-controller module 1000. Operation 2552 supports creating the coupling 212 of the network interface circuit 1030 to 1104 the means for wirelessly communicating 1100.

In FIGS. 7A and 8B, the network interface circuit 1030 may preferably support at least one wireline communications protocol via the network coupling 1104 with the means for wirelessly communicating 1100.

Figure 8C:
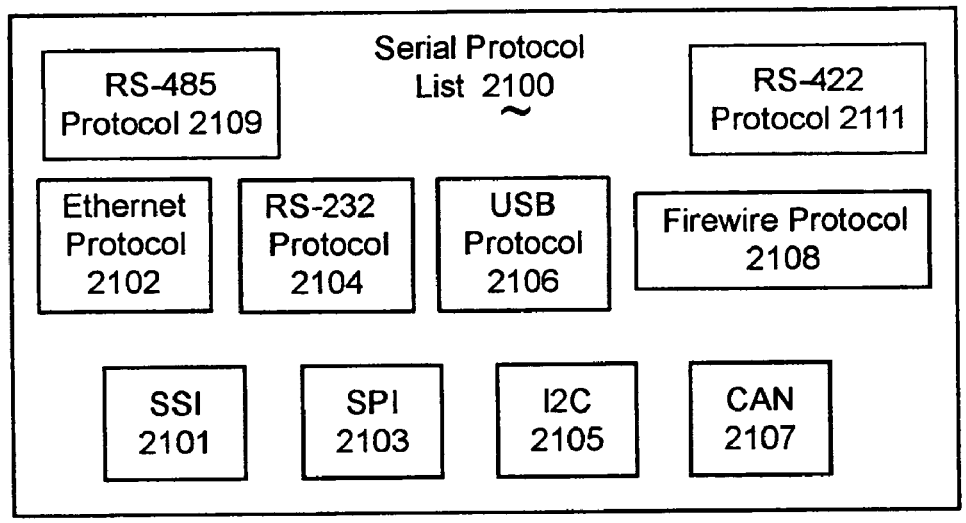
FIG. 8C shows a serial protocol list.

The wireline communications protocol may support a version of at least one member of a serial protocol list 2100 shown in FIG. 8C, including the following.

A Synchronous Serial Interface protocol 2101, sometimes abbreviated SSI.

An Ethernet protocol 2102.

A Serial Peripheral Interface 2103, sometimes abbreviated SPI.

An RS-232 protocol 2104.

An Inter-IC protocol 2105, sometimes abbreviated I2C.

An Universal Serial Bus protocol 2106, sometimes abbreviated USB.

A Controller Area Network protocol 2107, sometimes abbreviated CAN.

A Firewire protocol 2108, which includes implementations the IEEE 1394 communications standard.

An RS-485 protocol 2109.

An RS-422 protocol 2111.

Figure 8D:
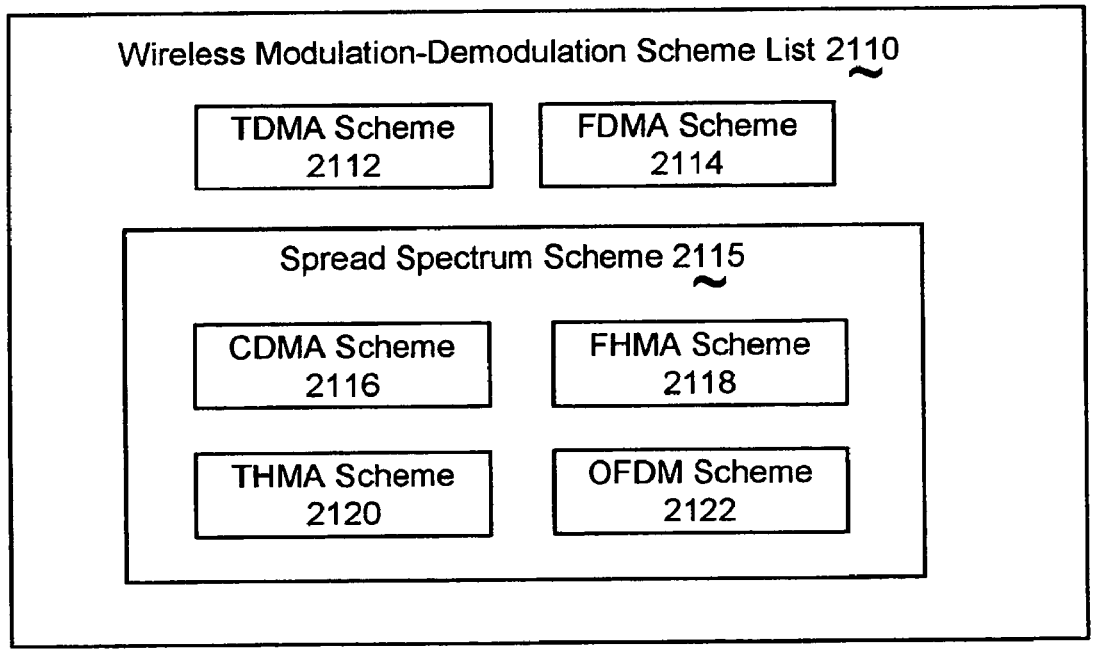
FIG. 8D shows a wireless modulation-demodulation scheme list.

In FIGS. 6A, 7A and 7C, the means for wirelessly communicating 1100 may preferably support communicating using at least one version of at least one member of a wireless modulation-demodulation scheme list 2110 shown in FIG. 8D. The wireless modulation-demodulation scheme list 2110 includes, but is not limited to, the following.

A Time Division Multiple Access scheme 2112, sometimes abbreviated TDMA.

A Frequency Division Multiple Access scheme 2114, sometimes abbreviated FDMA.

And a Spread Spectrum Scheme 2115, which may include variations on one or more of the following:

A Code Division Multiple Access scheme 2116, sometimes abbreviated CDMA.

A Frequency Hopping Multiple Access scheme 2118, sometimes abbreviated FHMA.

A Time Hopping Multiple Access scheme 2120, sometimes abbreviated THMA.

And an Orthogonal Frequency Division Multiple access scheme 2122, sometimes abbreviated OFDM.

Figure 9A:
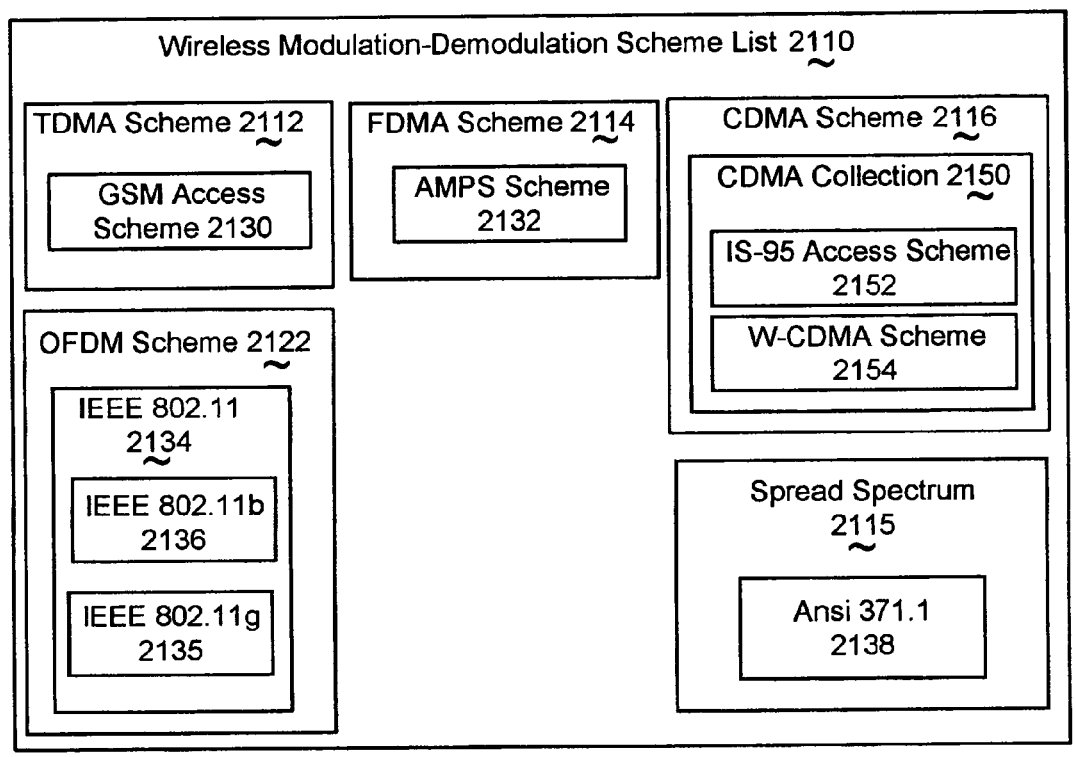
FIG. 9A shows a refinement of part of the wireless modulation-demodulation scheme list of FIG. 8D.

FIG. 9A shows a refinement of part of the wireless modulation-demodulation scheme list 2110 of FIG. 8D, which includes the following.

At least one version of the Time Division Multiple Access scheme 2112 (TDMA) may preferably include a GSM access scheme 2130.

At least one version of the Frequency Division Multiple Access scheme 2114 (FDMA) may preferably include an AMPs scheme 2132.

At least one version of the Code Division Multiple Access scheme 2116 (CDMA) may preferably include at least one member of the CDMA scheme list 2150.

At least one version of the Orthogonal Frequency Division Multiple access scheme 2122 (OFDM) may preferably include at least one IEEE 802.11 access scheme 2134. At least one version of the IEEE 802.11 access scheme 2134 may include the IEEE 802.11b access scheme 2136. At least one version of the IEEE 802.11 access scheme 2134 may include the IEEE 802.11g access scheme 2135.

At least one version of the Spread Spectrum Scheme 2115 uses the Ansi 371.1 scheme 2138 for radio frequency identification and/or location tags.

In FIG. 9A, the CDMA scheme list 2150 may preferably include, but is not limited to, An IS-95 access scheme 2152, which uses at least one spreading code to in modulating and demodulating an access channel.

A Wideband CDMA access scheme 2154, sometimes abbreviated W-CDMA. W-CDMA schemes use not only a spreading code, but also a scattering code to modulate and demodulate an access channel.

Figure 9B:
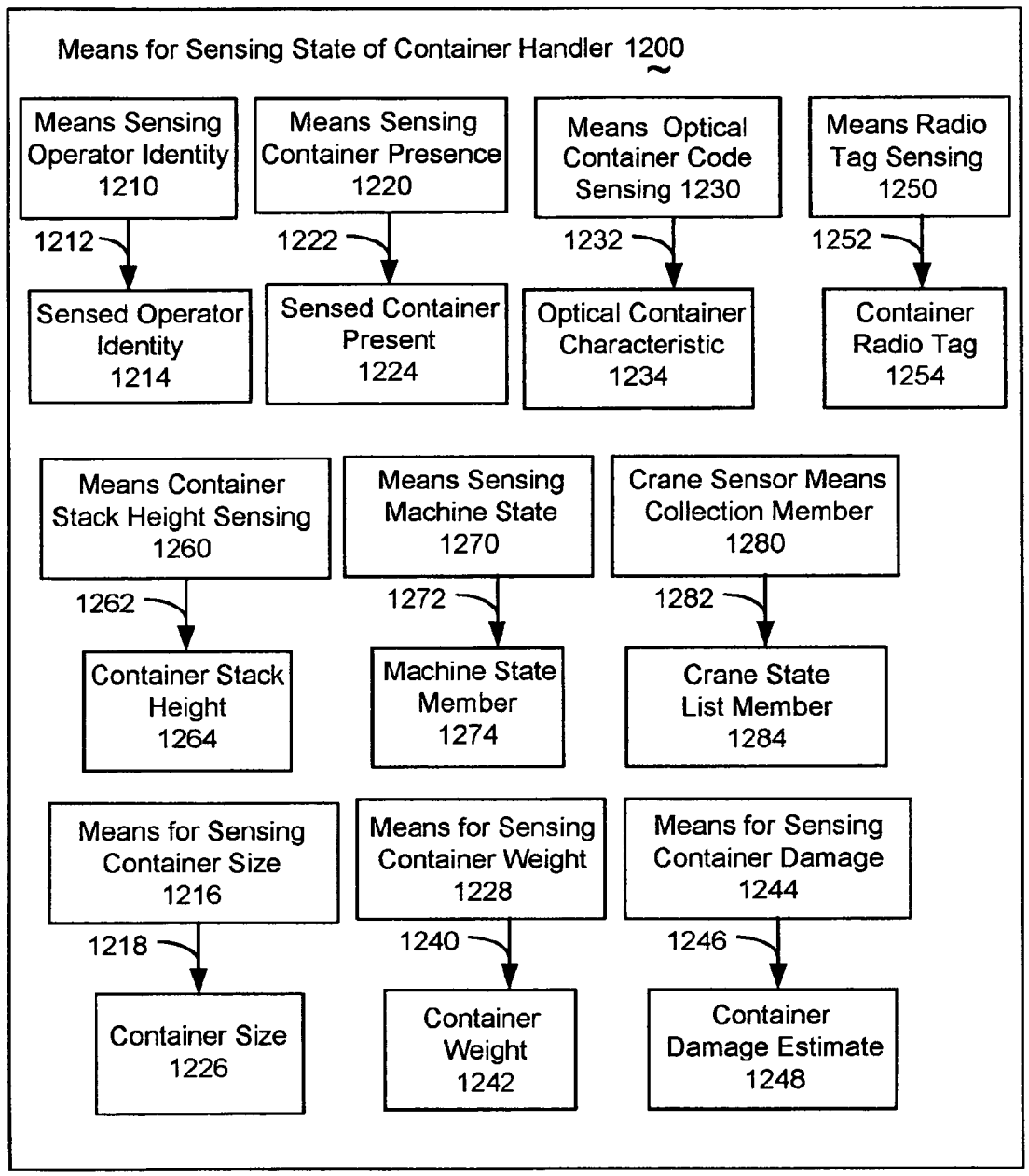
FIG. 9B shows some refinements of the means of FIGS. 6A and 7A for sensing the state of the container handler.

FIG. 9B shows some refinements of the means for sensing state 1200 of the container handler of FIGS. 6A and 7A. Note that the preferred status reporting device 800 for various of the container handler 78 may include one or more of the means for sensing state 1200 shown in this Figure. The means for sensing state 1200 of the container handler may preferably include at least one of the following A means for sensing operator identity 1210, which provides 1212 a sensed operator identity 1214.

A means for sensing container presence 1220, which second provides 1222 a sensed container present 1224.

A means for optical container code sensing 1230, which third provides 1232 an optical container characteristic 1234.

A means for radio frequency tag sensing 1250 of a radio frequency tag on the container 2 fourth providing 1252 a container radio frequency tag 1254.

A means for container stack height sensing 1260 of the container 2 fifth providing 1262 a container stack height 1264. In certain embodiments the means for container stack height sensing 1260 may preferably include a cam switch.

Figure 10A:
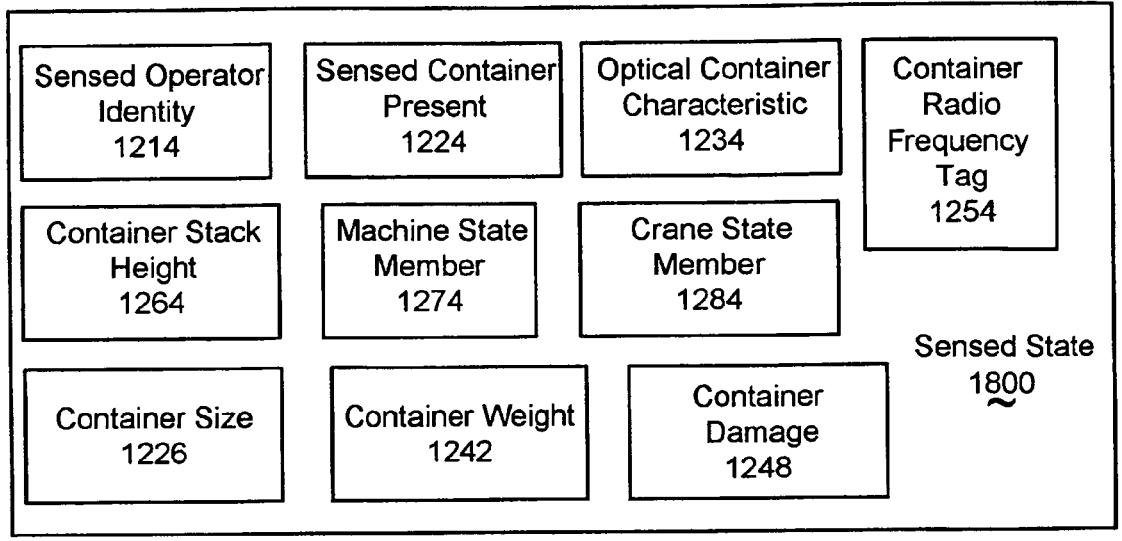
FIG. 10A shows some refinements of the sensed state of FIGS. 6A and 7A.
Figure 10B:
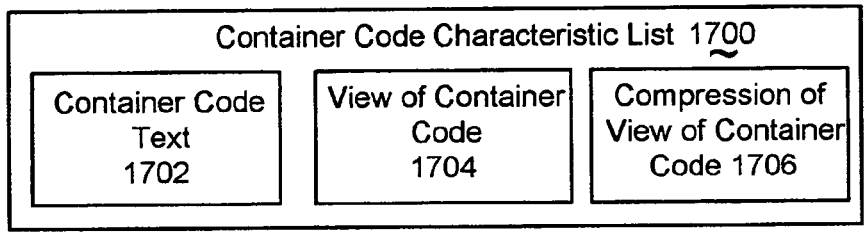
FIG. 10B shows a container code characteristic list.
Figure 10C:
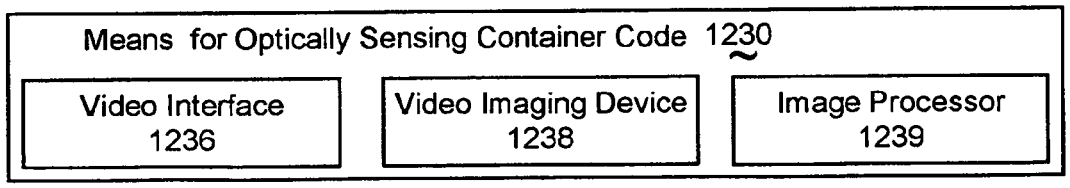
FIG. 10C shows some preferred alternative embodiments of the means for optically sensing the container code on the container of FIG. 9B.
Figure 10D:
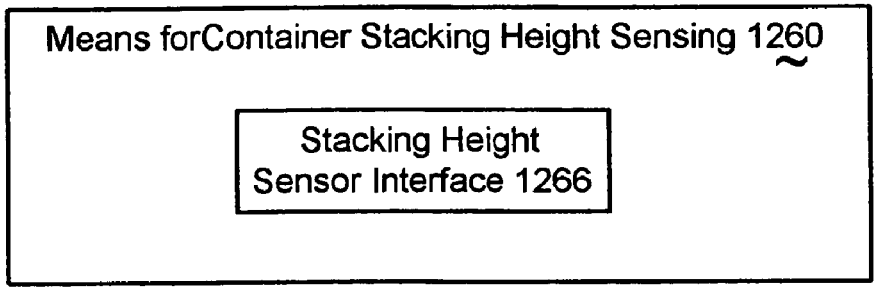
FIG. 10D shows a further preferred embodiment of the means for sensing the stacking height, including a stacking height sensor interface to a stacking height sensor on the container handler.
Figure 10E:
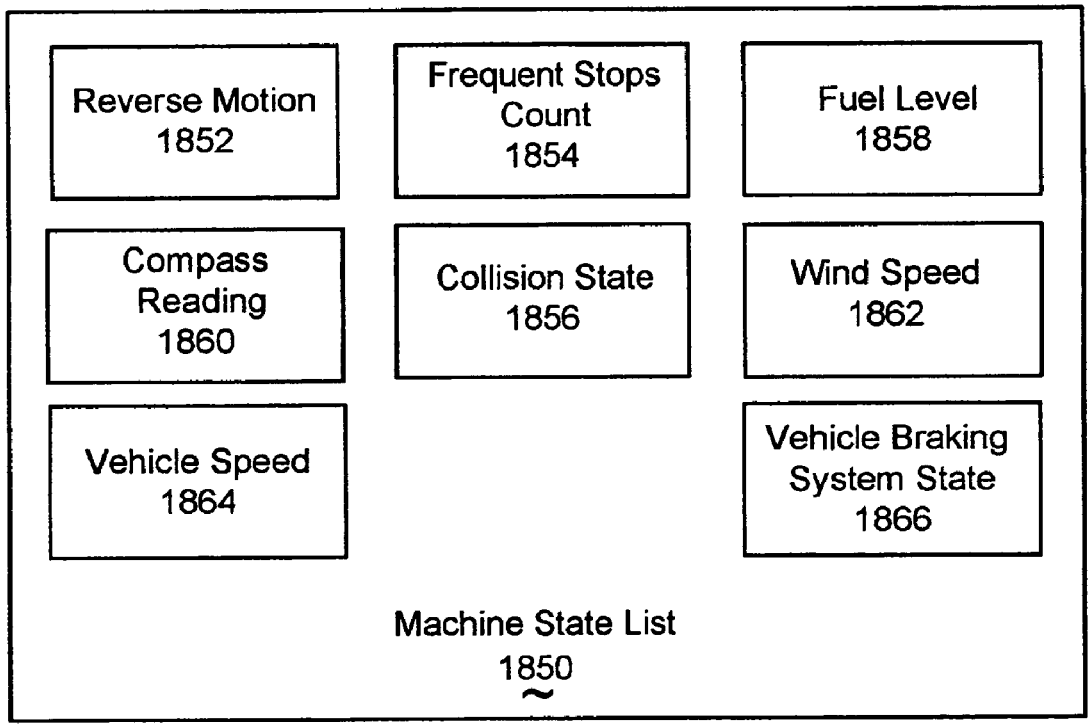
FIG. 10E shows a preferred embodiment of the machine state list.

At least one means for sensing a machine state list member 1270 of the container handler, sixth providing 1272 a machine state list member 1274 of the machine state list 1850, shown in FIG. 10E.

Figure 12A:
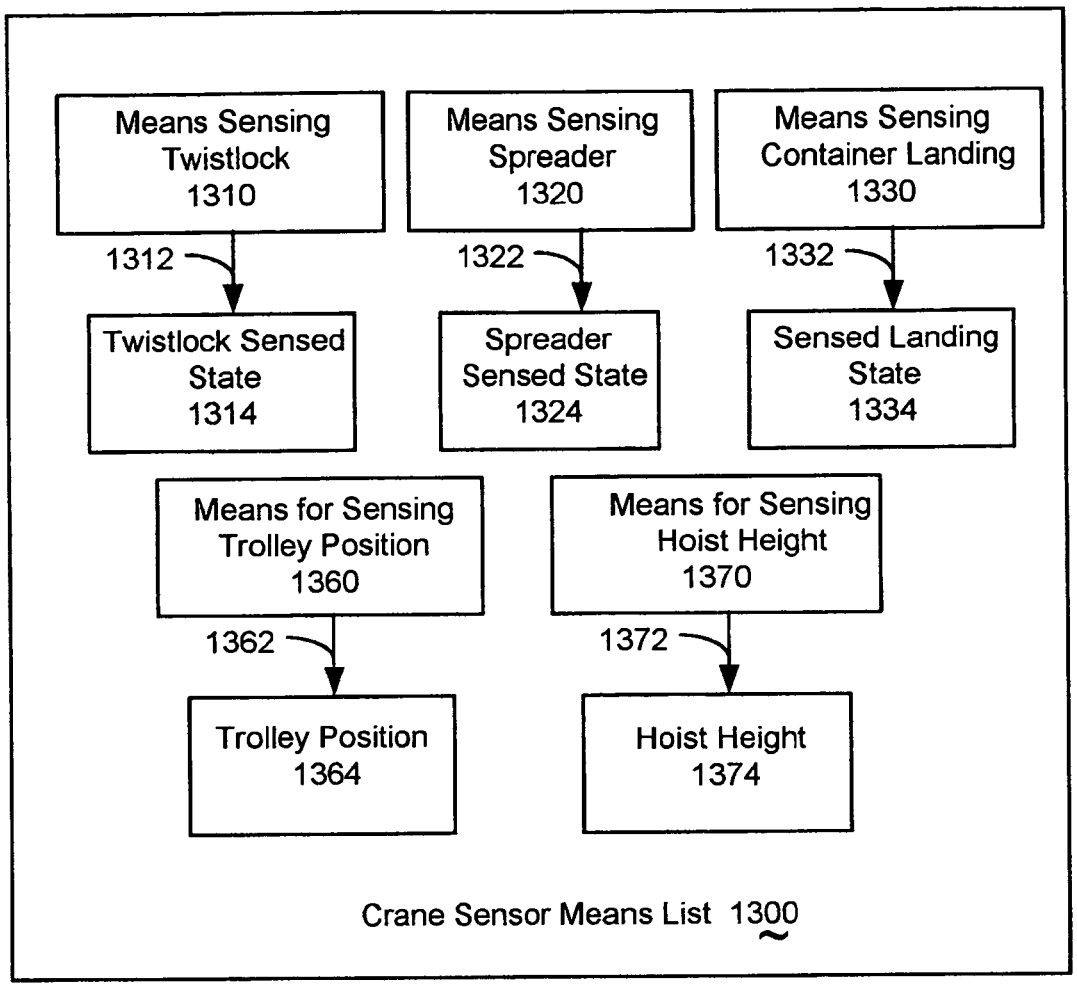
FIG. 12A shows some details of the crane sensor means list related to members of FIG. 9B.
Figure 12B:
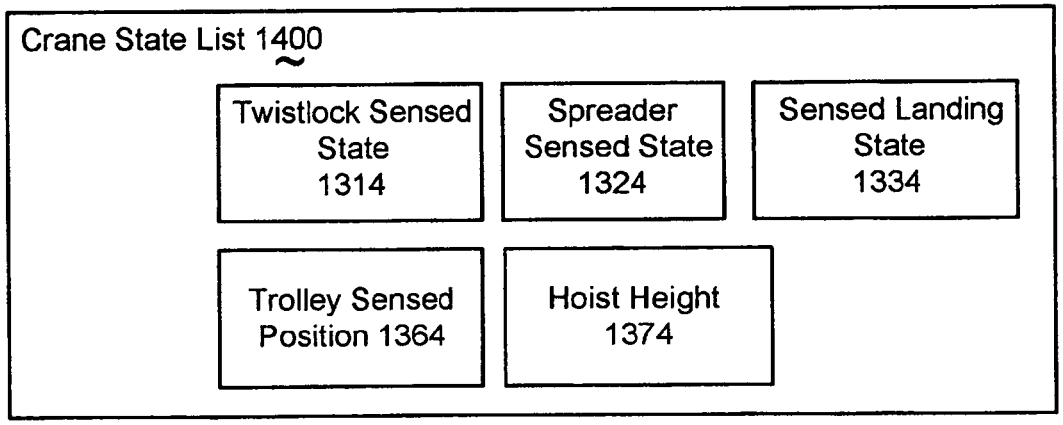
FIG. 12B shows some details of the crane state list related to members of FIGS. 9B and 10A.

At least one crane sensor means list member 1280 seventh providing 1282 at least one crane state list member 1284 of a crane state list 1400 of FIG. 12B. The crane sensor means list member 1280 is a member of the crane sensor means list 1300 shown in FIG. 12A.

A means for sensing container size 1216 seventeenth providing 1218 a container size 1226. The container size 1226 may preferably be denoted similarly to the spreader state list 1420 of FIG. 12D. In certain embodiments, for example for use on a UTR truck 10, the means for sensing container size 1216 may include an ultrasonic sensor to estimate the container size on the back of a bomb cart 14. The ultrasonic sensors measures the delay in an echo from the side of the container 2 to estimate its container size 1226.

A means for sensing container weight 1228 eighteenth providing 1240 a container weight 1242.

And a means for sensing container damage 1244 nineteenth providing 1246 a container damage estimate 1248.

In FIG. 9B, the various combinations of some or all of the providings may be similarly implemented.

Among providings similarly implemented, these providings may share a single communication mechanism with the computer 1010.

Among providings similarly implemented, these providings may use multiple communication mechanisms with the computer 1010.

In FIG. 9B, some or all of the providings may be distinctly implemented.

In FIG. 9B, the providings may include at least one instance of the following:

provides 1212 a sensed operator identity 1214, second provides 1222 a sensed container present 1224, third provides 1232 an optical container characteristic 1234, fourth providing 1252 a container radio frequency tag 1254, fifth providing 1262 a container stack height 1264, sixth providing 1272 a machine state list member 1274, seventh providing 1282 at least one crane state list member 1284 of the crane state list 1400 shown in FIG. 12B, seventeenth providing 1218 a container size 1226, eighteenth providing 1240 a container weight 1242, and nineteenth providing 1246 a container damage estimate 1248.

By way of example, the seventh providing 1282 of FIG. 9B, for a rubber tire gantry crane 20 or a straddle carrier 54, may preferably use at least one of the Synchronous Serial Interface protocol 2101, the RS-232 Protocol 2104, the RS-422 Protocol 2111 and/or the RS-485 Protocol 2109.

The crane sensor means list member 1280 may preferably include the means for sensing trolley position 1360 fourteenth providing 1362 a trolley position 1364 as in FIG. 12A.

The crane sensor means list member 1280 may preferably include the means for sensing hoist height 1370 fifteenth providing 1372 a hoist height 1374.

The means for sensing trolley position 1360 and/or the means for sensing hoist height 1370 may preferably include a rotary absolute optical encoder with either a hollow shaft or standard shaft.

FIG. 10A shows some refinements of the sensed state 1800 of FIGS. 6A and 7A based upon the means for sensing state 1200 of FIG. 9B. The sensed state 1800 may preferably include at least one of the following, The sensed operator identity 1214.

The sensed container present 1224. The sensed container present 1224 may preferably be a boolean value of true or false.

The optical container characteristic 1234.

The container radio frequency tag 1254.

The container stack height 1264. The container stack height 1264 may be interpreted as in the discussion of FIG. 3B.

At least one instance of at least one machine state list member 1274.

At least one of the crane state list members 1284.

The container size 1226.

The container weight 1242.

The container damage estimate 1248.

The optical container characteristic 1234 of FIGS. 9B and 10A may preferably include at least one instance of a member of a container code characteristic list 1700, shown in FIG. 10B, which may preferably include a container code text 1702, a view 1704 of the container code 4 of the container 2, and a compression 1706 of the view 1704 of the container code 4 of the container 2.

FIGS. 11A and 11B show examples of the view 1704 in FIG. 10B, of the container code 4 optically viewed on the side of the container 2 of FIGS. 1, 3A, and 4A. The view 1704 of the container code 4 may preferably and alternatively be viewed on any of the vertical sides of the container 2.

The compression 1706 of the view 1704 may include, but is not limited to, a still frame compression and/or a motion sequence compression of a succession of frames of views.

The compression 1706 may be at least partly the result of applying a two dimensional (2-D) block transform, such as the 2-D Discrete Cosine Transform (DCT) and/or a 2-D wavelet filter bank.

Alternatively, the compression 1706 may be at least partly the result of a fractal compression method.

FIG. 11C shows an example of the container code text 1702 of FIG. 10B.

The container code text 1702 may be at least partly the result of optical character recognition applied to the view 1704 of FIG. 11B.

The means for optical container code sensing 1230 of FIG. 9B may include optical character recognition capabilities, which may be embodied as a separate optical character recognition hardware module or as a separate optical character recognition program system.

The separate optical character recognition hardware module may reside within the means for optical container code sensing 1230 and/or may be coupled to the means for optical container code sensing 1230.

The separate optical character recognition program system may reside within the means for optical container code sensing 1230 and/or may be coupled to the means for optical container code sensing 1230.

The status reporting device 800 of FIG. 6A may include an optical characteristic system as the means for optical container code sensing 1230 of FIG. 9B, in housing 3000 of FIGS. 1, 2, 5A and 5B.

The means for optical container code sensing 1230 may include at least one and preferably two of the video imaging device 1238 of FIG. 10C, housed in a first housing 3100 and a second housing 3110 as in FIGS. 1 and 2.

The first housing 3100 and the second housing 3110 may be mechanically coupled to a container handler 20 or 30 as in FIGS. 1 and 2.

The status reporting device 800 may also include at least one, and preferably more than one, light 3120. The lights 3120 may be controlled through interaction with the invention.

The mechanical coupling of the means for optical container code sensing 1230 to the rubber tire gantry crane 20 may preferably include a mechanical shock absorber to improve reliability.

FIG. 10C shows some preferred alternative embodiments of the means for optical container code sensing 1230 of FIG. 9B. The means for optical container code sensing 1230 of the container code 4 on the container 2 may preferably include any combination of the following.

A video interface 1236 to receive at least one optical container characteristic 1234 of the container code 4.

At least one video imaging device 1238 to create at least one optical container characteristic 1234 of the container code. The video imaging device 1238 may be in a separate housing and/or location as shown by the first housing 3100 and/or the second housing 3110 in FIGS. 1, 2, and 5A.

At least one image processor 1239 may process and/or create at least one of the optical container characteristic 1234.

The video imaging device 1238 may belong to a list including at least a video camera, a digital video camera, and a charged coupled array.

The video imaging device 1238 may further include any of the following: a computer, a digital memory, an instance of the image processor 1239 and/or a flash lighting system.

FIG. 10D shows a further preferred embodiment of the means for container stack height sensing 1260, including a stacking height sensor interface 1266 to a stacking height sensor on the container handler 78. One stacking height sensor, which may be preferred, is a draw wire encoder.

The draw wire encoder may be preferred when the container handler is at least one of the following: the rubber tire gantry crane 20, the side picker 40, the top loader 50, the reach stacker 46, and/or the straddle carrier 54.

Alternatively, the stacking height sensor may be an absolute/hollow shaft encoder.

FIG. 10E shows a preferred embodiment of the machine state list 1850. The machine state list 1850 may include, but is not limited to, a reverse motion 1852,
a frequent stops count 1854,
a collision state 1856,
a fuel level 1858,
a compass reading 1860,
a wind speed 1862. In certain embodiments, the wind speed may further indicate a wind direction,
a vehicle speed 1864, and
a vehicle braking system state 1866.

In some preferred embodiments, the means for sensing a machine state list member 1270, the machine state list member 1274 includes the vehicle speed 1864, may preferably include a drive shaft sensor counting the drive shaft revolutions.

FIG. 12A shows some details of the crane sensor means list 1300 related to at least one instance of the crane sensor means list member 1280 of FIG. 9B. The crane sensor means list 1300 preferably includes at least one of the following A means for twistlock sensing 1310 eighth providing 1312 a twistlock sensed state 1314.

The means for spreader sensing 1320 to ninth provide 1322 a spreader sensed state 1324.

The means for sensing container landing 1330 to tenth provide 1332 a sensed landing state 1334.

The means for sensing trolley position 1360 fourteenth providing 1362 a trolley position 1364.

The means for sensing hoist height 1370 fifteenth providing 1372 a hoist height 1374.

The means for sensing trolley position 1360 and/or the means for sensing hoist height 1370 may preferably include a rotary absolute optical encoder with either a hollow shaft or standard shaft.

Figure 12C:
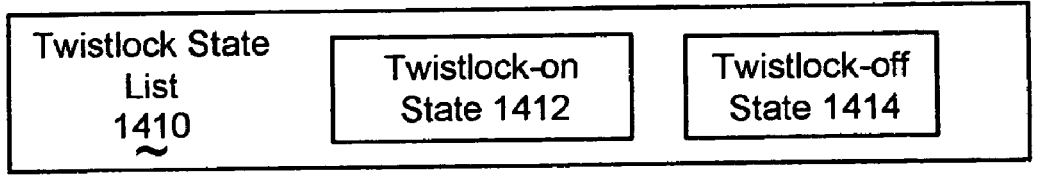
FIG. 12C shows some details of a twistlock state list related to members of FIG. 12A.

In FIG. 12A, the twistlock sensed state 1314, preferably, is a member of a twistlock state list 1410 shown in FIG. 12C. FIG. 12C shows the twistlock state list 1410 including a twistlock-on state 1412 and a twistlock-off state 1414.

Figure 12D:
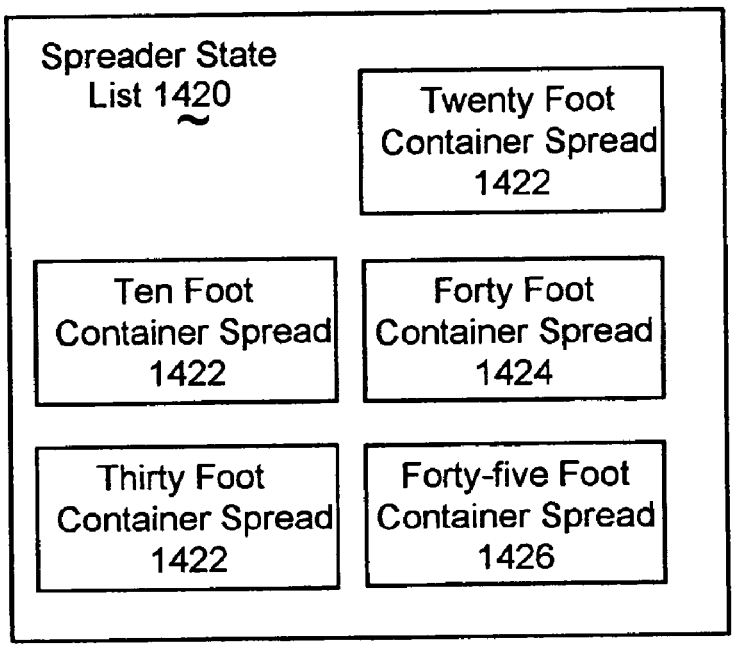
FIG. 12D shows some details of the spreader state list related to members of FIG. 12A.

In FIG. 12A, the spreader sensed state 1324, preferably is a member of a spreader state list 1420 shown in FIG. 12D. FIG. 12D shows the spreader state list 1420 including a ten foot container spread 1421, a twenty foot container spread 1422, a thirty foot container spread 1428, a forty foot container spread 1424, and a forty-five foot container spread 1426.

Various embodiments may support the spreader sensed state 1324 limited to a subset of the spreader state list 1420.

By way of example, in certain preferred embodiments, the spreader sensed state 1324 may be limited to a subset of the spreader state list 1420 consisting of the twenty foot container spread 1422 and the forty foot container spread 1424.

Figure 12E:
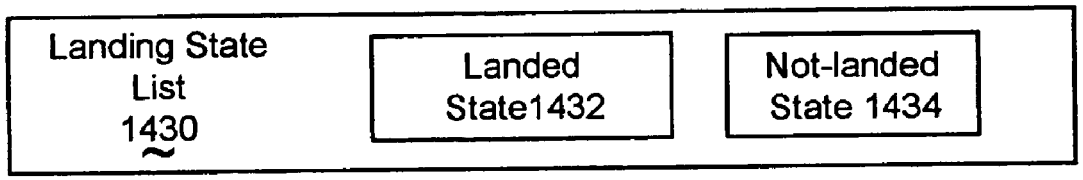
FIG. 12E shows some details of the landing state list related to members of FIG. 12A.

In FIG. 12A, the sensed landing state 1334, preferably, is a member of a landing state list 1430 shown in FIG. 12E. FIG. 12E shows the landing state list 1430 including a landed state 1432 and a not-landed state 1434.

FIG. 12B shows some details of the crane state list 1400 related to the crane state list member 1284 of FIGS. 9B and 10A. The crane state list 1400 preferably includes at least one of the following The twistlock sensed state 1314, The spreader sensed state 1324, The sensed landing state 1334.

FIG. 13A shows a refinement of the status reporting device 800 of FIGS. 6A and 7A where the means for sensing state 1200 includes a crane spreader interface connection 1340.

The crane spreader interface connection 1340 preferably provides at least one member of the crane state list 1400 as shown in FIG. 12B.

The crane spreader interface connection 1340 eleventh provides 1344 the twistlock sensed state 1314.

The crane spreader interface connection 1340 twelfth provides 1346 the spreader sensed state 1324.

The crane spreader interface connection 1340 thirteenth provides 1348 the sensed landing state 1334.

FIG. 13A also shows the status reporting device 800 with the means for sensing state 1200 of the container handler 78 including a crane sensor coupling 1342 of the computer 1010 of FIGS. 6A and 7A to the crane spreader interface connection 1340.

The crane sensor coupling 1342 may preferably include conversion circuitry interfaced to parallel input and/or output ports of the computer 1010. The conversion circuitry may interface AC lines through relays.

In certain embodiments, the crane sensor coupling 1342 may be included in the second communicative coupling 1202 of the micro-controller module 1000 with the means for sensing state 1200.

Alternatively, the crane sensor coupling 1342 may not be included in the second communicative coupling 1202 of the micro-controller module 1000 with the means for sensing state 1200.

By way of example, the crane spreader interface connection 1340 of FIG. 13A may contain the spreader sensed state 1324 as two signals.

The two signals are the "spreader is at least twenty foot", and the "spreader is at forty foot".

If the "spreader is at least at twenty foot" is true and the "spreader is at forty foot" is false, then the sensed spreader state 1324 indicates the crane spreader is set for twenty foot.

If the "spreader is at least at twenty foot" is true and the "spreader is at forty foot" is true, then the sensed spreader state 1324 indicates the crane spreader set for forty foot.

By way of example, the crane spreader interface connection 1340 of FIG. 13A may contain the spreader sensed state 1324 as three signals.

The two signals are the "spreader is at least at twenty foot", the "spreader is at forty foot", and the "spreader is at least forty-five foot".

If the "spreader is at least at twenty foot" is true, the "spreader is at forty foot" is false, and the "spreader is at least forty-five foot" is false, then the sensed spreader state 1324 indicates the crane spreader is set for twenty foot.

If the "spreader is at least at twenty foot" is true, the "spreader is at forty foot" is true, and the "spreader is at least forty-five foot" is false then the sensed spreader state 1324 indicates the crane spreader set for forty foot.

If the "spreader is at least at twenty foot" is true, the "spreader is at forty foot" is true, and the "spreader is at least forty-five foot" is true then the sensed spreader state 1324 indicates the crane spreader set for forty-five foot.

In FIG. 13A, some or all of the providings may be similarly implemented. Among those providings similarly implemented, they may use the same of different mechanisms to provide. Alternatively, some of the providings may be distinctly implemented. The providings of FIG. 13A include The eleventh provides 1344 the twistlock sensed state 1314.

The twelfth provides 1346 the spreader sensed state 1324.

The thirteenth provides 1348 the sensed landing state 1334.

FIG. 13B shows a refinement of the status reporting device 800 of FIGS. 6A and 7A, with the means for sensing state 1200 of the container handler 78, including a Programmable Logic Controller 1350, which is sometimes denoted PLC.

The Programmable Logic Controller 1350 preferably provides at least one member of the crane state list 1400 as shown in FIG. 12B.

Preferably, the Programmable Logic Controller 1350 may fourteenth provide 1354 the twistlock sensed state 1314.

Preferably, the Programmable Logic Controller 1350 may fifteenth provide 1356 the spreader sensed state 1324.

Preferably, the Programmable Logic Controller 1350 may sixteenth provide 1358 the sensed landing state 1334.

FIG. 13B also shows the status reporting device 800 including a second crane sensor coupling 1352 of the computer 1010 of FIGS. 6A, 7A and 13A with the Programmable Logic Controller 1350.

The second crane sensor coupling 1352 may preferably include a serial communications coupling 1352.

The serial communications coupling 1352 preferably supports a version of at least one member of a serial protocol list 2100 of FIG. 8C.

In FIG. 13B, some or all of the providings may be similarly implemented. Among those providings similarly implemented, they may use the same of different mechanisms to provide. Alternatively, some of the providings may be distinctly implemented. The providings of FIG. 13B include The fourteenth provide 1354 the twistlock sensed state 1314.

The fifteenth provide 1356 the spreader sensed state 1324.

The sixteenth provide 1358 the sensed landing state 1334.

In FIGS. 13A and 13B, the container handler 78 may preferably be a version of a member of the container handler list 80 of FIG. 4B. The container handler 78 may also be an assembly of two or more members of the container handler list 80. By way of example, the container handler 78 may include the UTR truck 10 of FIG. 1 attached to the Bomb cart 14. In certain situations, the UTR truck 10 may be attached to an over the road chassis.

Figure 14A:
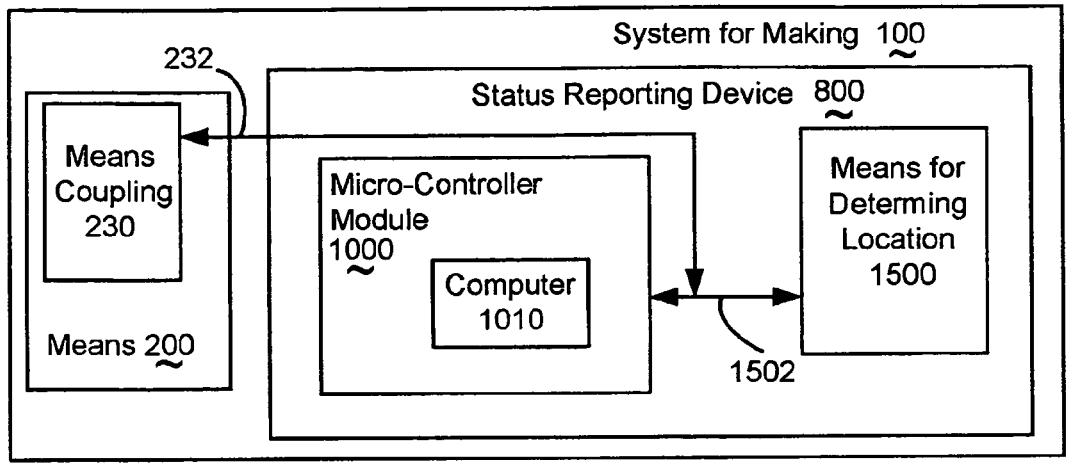
FIG. 14A shows the providing means of FIGS. 6A and 7A further including a means for coupling the micro-controller module with a means for locating the container handler.

FIG. 14A shows the means for providing 200 of FIGS. 6A and 7A further including a means for location coupling 230.

The means for location coupling 230 assembles 232 the micro-controller module 1000 with a means for determining 1500 location the container handler.

Figure 14B:
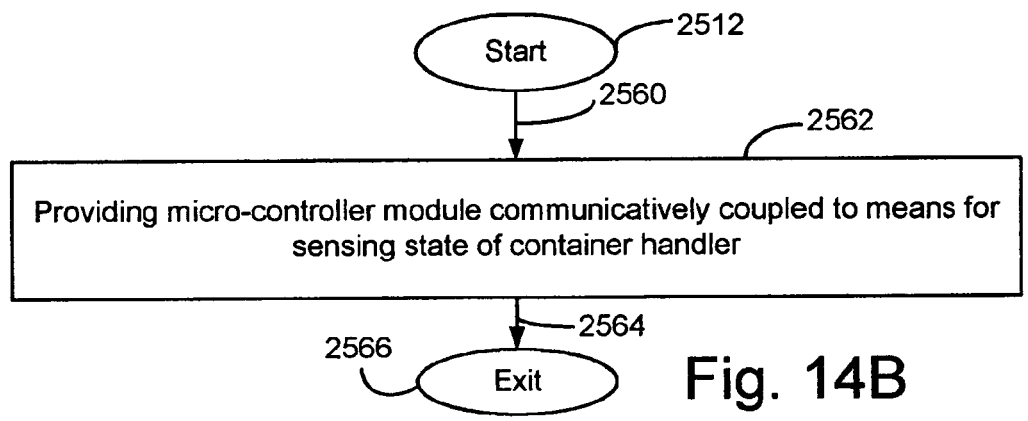
FIG. 14B shows a detail flowchart of FIG. 8A further providing the micro-controller module with the coupled means for sensing the state of the container handler of FIGS. 6A and 7A.

FIG. 14B shows a detail flowchart of operation 2512 of FIG. 8A further providing the micro-controller module 1000 with the coupled means 1200 for sensing the state of the container handler of FIGS. 6A and 7A. Operation 2562 supports providing the micro-controller module 1000 with the second communicative coupling 1202 to the means for sensing state 1200 of the container handler.

Figure 14C:
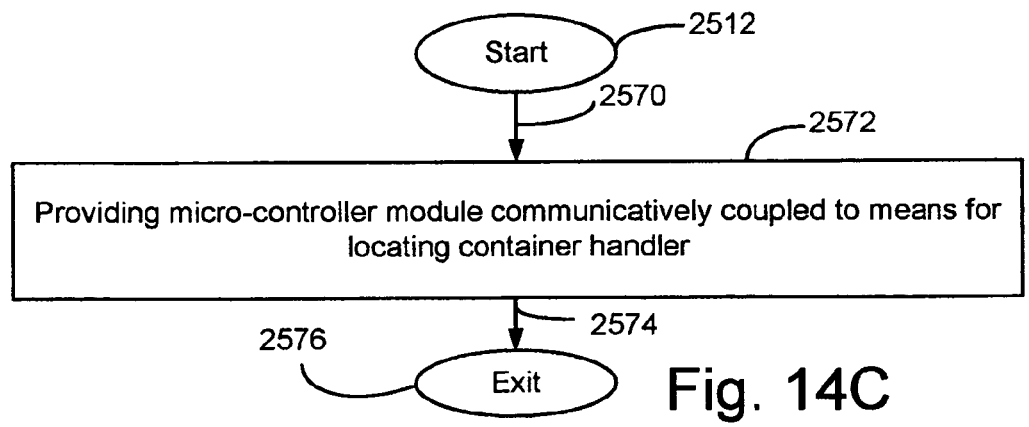
FIG. 14C shows a detail of FIG. 8A further providing the micro-controller module with the coupled means for locating the container handler of FIG. 14A.

FIG. 14C shows a detail of operation 2512 of FIG. 8A further providing the micro-controller module 1000 coupled with the means for determining 1500 the location the container handler of FIG. 14A. Operation 2572 supports providing the micro-controller module 1000 communicatively coupling 1502 to a means for determining 1500 the location of the container handler.

In FIG. 14A, the means for determining 1500 may include one or more of the following:
- An interface to a Global Positioning System (GPS).
- An interface to a Differential Global Positioning System (DGPS).
- A means for wirelessly determining location, such as by use of a local wireless network providing timed signal bursts from multiple antenna sites within the local wireless network.
- A radio location-tag unit.

As used herein, GPS is a satellite communications system, which supports determining the location of a receiver. DGPS is a refinement of the GPS using an earth-based reference station to support positional accuracy to within a meter.

Figure 15A:
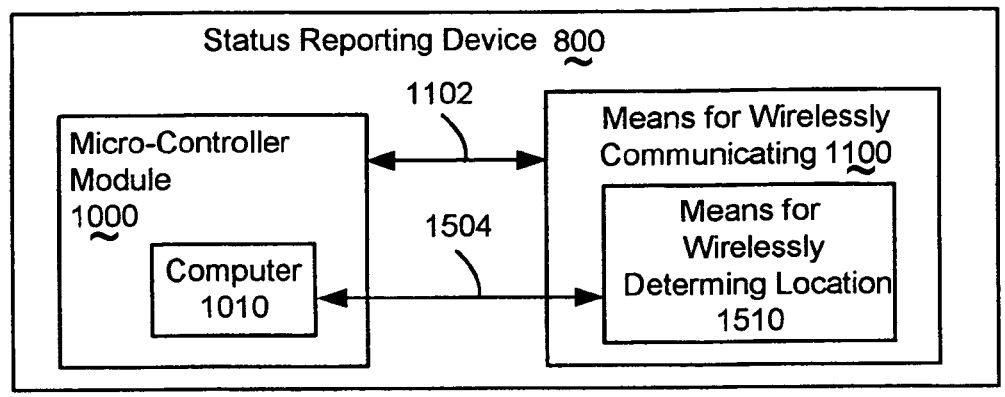
FIG. 15A shows the means for wirelessly communicating, including the means for wirelessly determining the location of the container handler.

FIG. 15A shows the means for wirelessly communicating 1100 including the means for wirelessly determining 1510 the location of the container handler. The means for wirelessly determining 1510 may include one or more of the following:
- An interface to the Global Positioning System (GPS).
- An interface to the Differential Global Positioning System (DGPS).
- Alternatively, the means for wirelessly determining 1510 may provide timed signal bursts to multiple antenna sites within the local wireless network to support the wireless network determining the location of itself. This means for wirelessly determining 1510 may not require the use or storage of an estimate of the location 1900 in the memory 1020 accessed 1022 by the computer 1010, as shown in FIG. 6A.

Figure 15B:
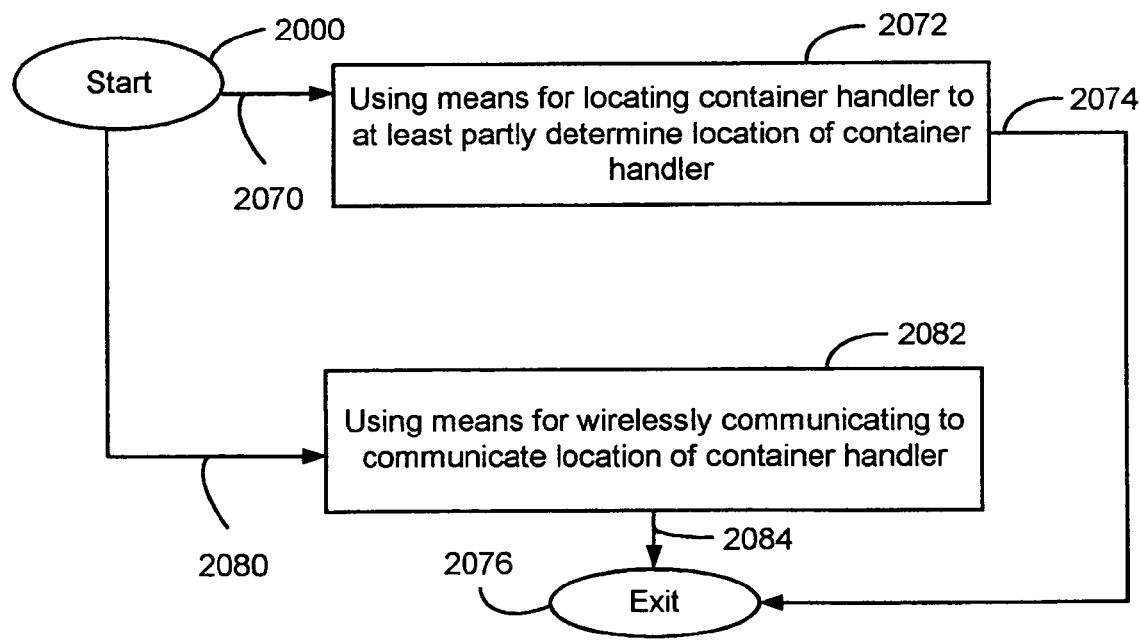
FIG. 15B shows a detail of the program system of FIGS. 6A and 6B for determining and communicating the location of the container handler.

FIG. 15B shows a detail of the program system 2000 of FIGS. 6A and 6B for determining and communicating the location of the container handler 78.
- Operation 2072 supports using the means 1500 of FIG. 14A for locating the container handler 78 to, at least partly, determine the location 1900 of the container handler 78.
- Operation 2082 uses the means for wirelessly communicating 1100 to communicate the location 1900.

In FIG. 15A, the means for wirelessly communicating 1100 may further include a radio location-tag unit.
- In certain preferred embodiments, the radio location-tag unit may act as the means for wirelessly determining 1510 the location 1900 of the container handler 78.
- The radio location-tag unit may further support a national and/or international standard, which may include, but is not limited to, a version of ANSI 371.1 standard for radio location tags.
- In such embodiments, the local computer 1010 may not require the location 1900 present in memory 1020, as shown in FIG. 6A.
- In such embodiments, the need for the program system 2000 to determine location may be non-existent, removing the presence of the operation of FIG. 15B.

FIG. 16A shows the memory 1020 of FIG. 6A including a non-volatile memory 1024. The computer 1010 may preferably access 1022 the non-volatile memory 1024, similarly to the discussion of FIG. 6A. The non-volatile memory 1024 may include at least part of the program system 2000.

Figure 16B:
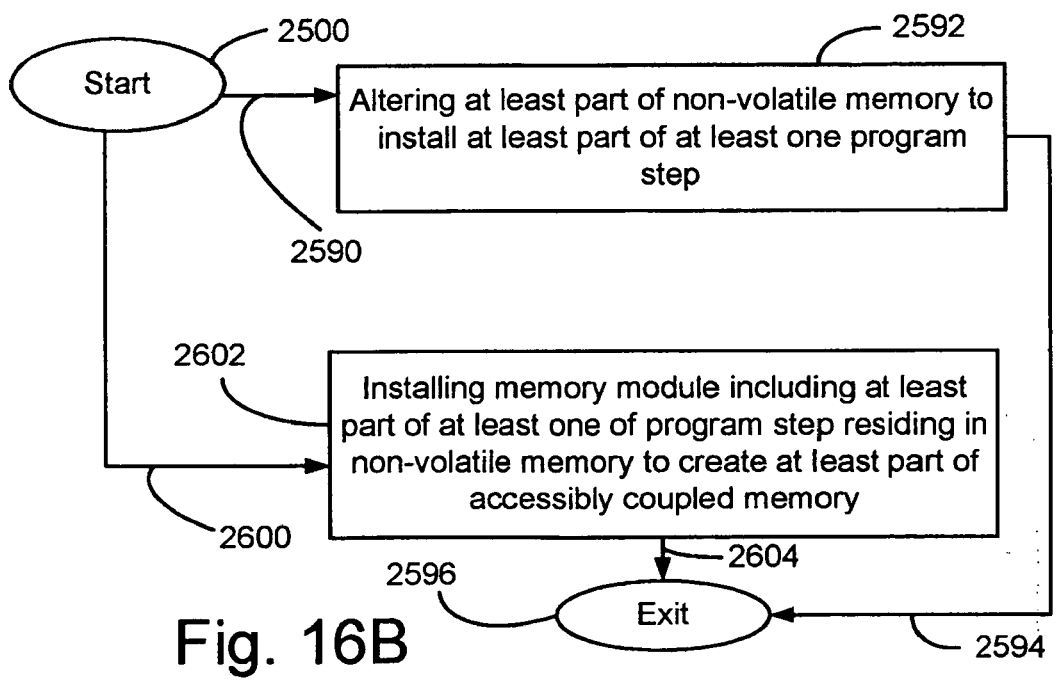
FIG. 16B shows a detail flowchart of FIG. 8A for installing the program system of FIG. 6A.

FIG. 16B shows a detail flowchart of operation 2522 of FIG. 8A further installing the program system 2000 of FIG. 6A.
- Operation 2592 supports altering at least part of the non-volatile memory 1024 of FIG. 16A to install at least part of at least one program step of the program system 2000.
- Operation 2602 supports installing a memory module including at least part of at least one of the program steps residing in the non-volatile memory 1024 to create at least part of the memory 1020 accessed 1022 by the computer 1010.

FIGS. 17 to 20 show various status reporting devices 800 for the rubber tire gantry crane 20 of FIG. 1. Similar embodiments are useful with the quay crane 30 of FIG. 2. In FIGS. 17 to 20, the means for sensing state 1200 is disclosed in terms of the details of its contents and communications.

FIG. 17 shows the status reporting device 800 communicating through couplings with
- The means for wirelessly communicating 1100,
- The display 3010, may preferably be a Liquid Crystal Display, and
- The means for sensing state 1200 includes the following:
- The means for sensing operator identity 1210,
- The means for container stack height sensing 1260,
- The means for sensing a machine state list member 1270,
- The crane spreader interface connection 1340,
- The means for determining 1500 location, further including a Differential Global Positioning System (DGPS), and
- A second means for determining 1500-B location, which preferably includes a means for sensing laser trolley position. Alternatively, this may incorporate a draw wire and/or rotary encoder.

In FIG. 17, the means for sensing a machine state list member 1270 provides the frequent stops count 1854, the collision state 1856, the fuel level 1858, the wind speed 1862, and the vehicle speed 1864.

Figure 20:
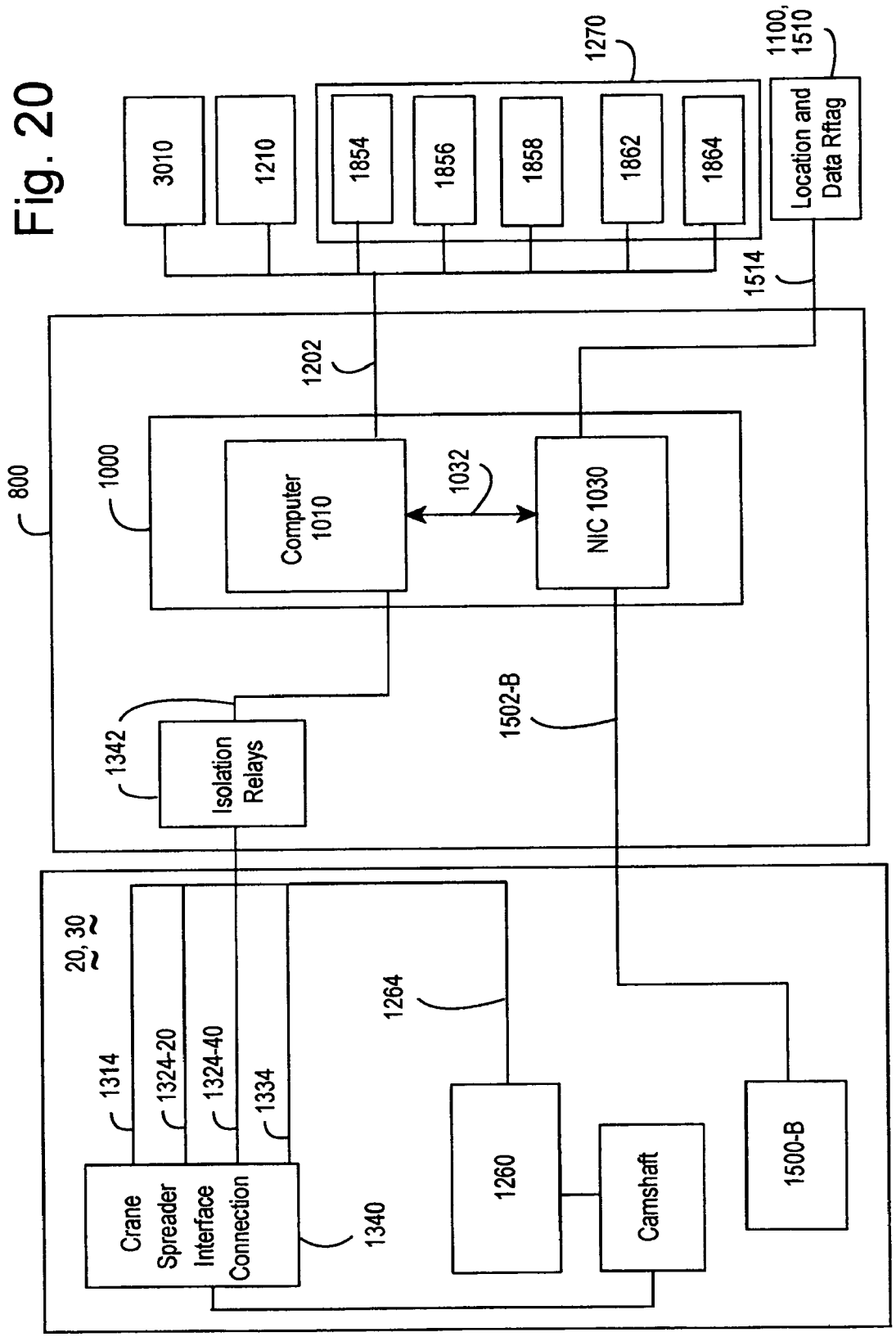

In FIGS. 17 and 20, the means for sensing state 1200 also provides, via the crane sensor coupling 1342, the following to the computer 1010:
- The twistlock sensed state 1314,
- The spreader sensed state 1324, which may further preferably include
- the spreader sense state at twenty foot 1324-20, and
- the spread sense state at forty foot 1324-40, and
- the sensed landing state 1334.

FIG. 18 shows the status reporting device 800 communicates via couplings with
- The means for wirelessly communicating 1100, which preferably includes a wireless modem preferably supporting a version of the IEEE 802.11 access scheme 2134, preferably the IEEE 802.11b access scheme 2136. Alternatively, the wireless modem may support an Radio Frequency IDentification (RF ID) protocol.

The display 3010, and

The means for sensing state 1200, which preferably includes the following

The means for sensing operator identity 1210,

The means for container stack height sensing 1260,

The means for sensing a machine state list member 1270, which provides the frequent stops count 1854, the collision state 1856, the fuel level 1858 and the wind speed 1862.

The Programmable Logic Controller 1350, and

The means for determining 1500 location, preferably using the Differential Global Positioning System (DGPS) of FIG. 14A, In FIG. 18, the computer 1010 couples through the Programmable Logic Controller 1350 with the following:

at least one means for container stack height sensing 1260, and a second means for determining 1500-B location, which preferably includes a means for sensing laser trolley position.

Figure 19:
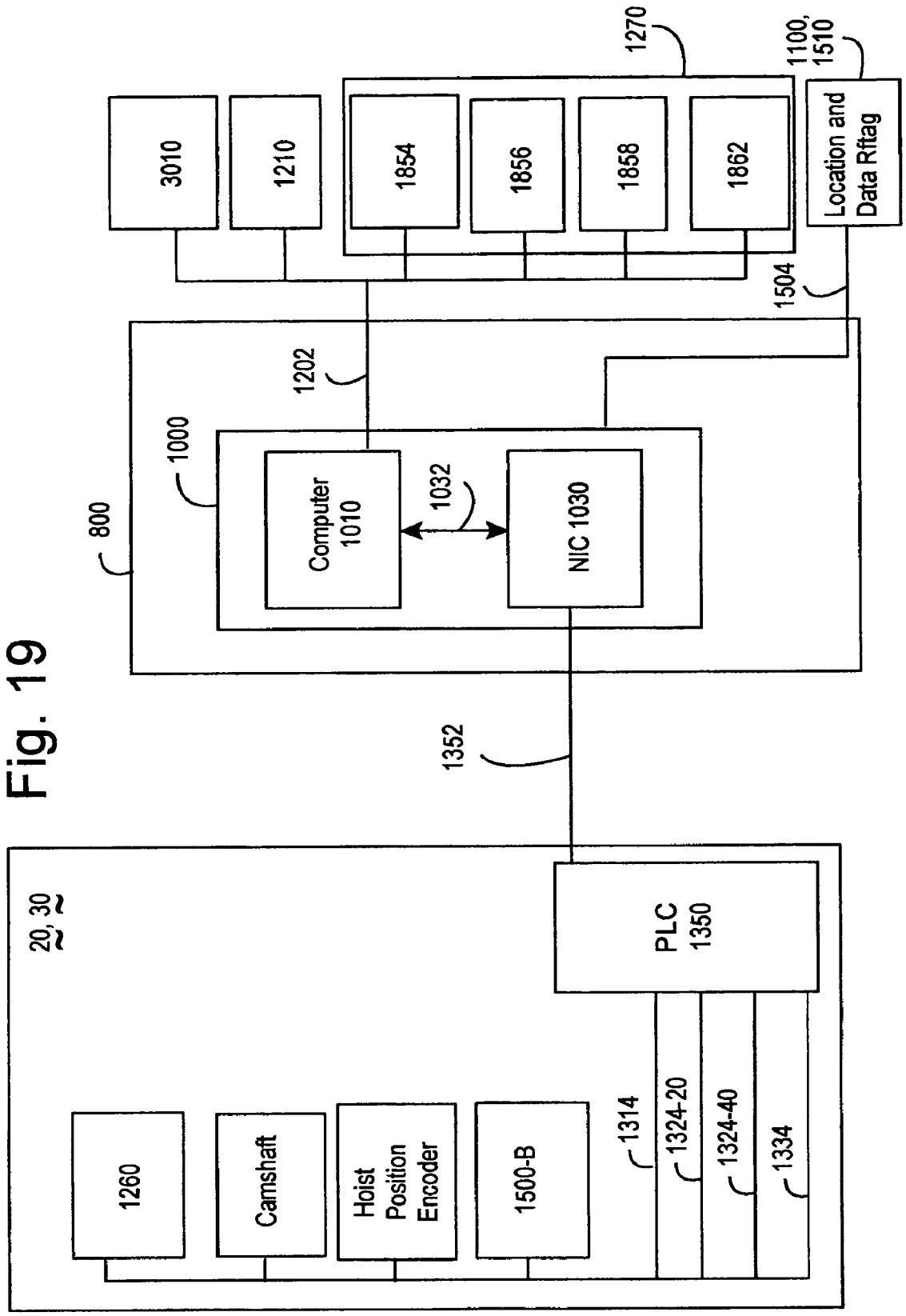

FIG. 19 shows the status reporting device 800 communicating via couplings with

The means for wirelessly communicating 1100, which further includes the means for wirelessly determining 1510 location of FIG. 15A. The means for wirelessly determining 1510 may preferably include a radio frequency tag device.

The display 3010.

And the means for sensing state 1200 which includes

The means for container stack height sensing 1260,

The Programmable Logic Controller 1350.

The means for sensing a machine state list member 1270, which preferably provides the frequent stops count 1854, the collision state 1856, the fuel level 1858, and the wind speed 1862.

The means for sensing operator identity 1210, similar to 1210 of FIGS. 17 and 18.

FIG. 20 shows the status reporting device 800 communicating via couplings with

The means for wirelessly communicating 1100 may preferably include the means for wirelessly determining 1510 location of FIG. 15A, which may preferably include a radio frequency tag device.

The display 3010.

And the means for sensing state 1200 which includes

The means for sensing operator identity 1210,

The means for container stack height sensing 1260,

The crane spreader interface connection 1340,

The second means for determining 1500-B location, and

The means for sensing a machine state list member 1270, which provides the frequent stops count 1854, the collision state 1856, the fuel level 1858, the wind speed 1862, and vehicle speed 1864.

In FIGS. 17 to 19, a second means 1500-B for determining the location of the container handler is used. The second means 1500-B may preferably be a trolley position sensor, which may be laser based. The second means 1500-B may preferably communicatively couple 1502-B via an RS-232 interface with the status reporting device 800.

FIGS. 17 to 23 show the means for container stack height sensing 1260.

Preferably, the means for container stack height sensing 1260 may include at least one cam shaft and/or at least one hoist position encoder when used with the rubber tire gantry crane 20 of FIG. 1.

Preferably, the means for container stack height sensing 1260 may include at least one cam shaft and/or at least one hoist position encoder when used with the quay crane 30 of FIG. 2.

These interact with one or more sensors of the sensor hoist-stack position to sense the stack height for a rubber tire gantry crane 20 or quay crane 30.

The means for sensing the stack height 1260 may involve as many as eight separate sensor states, which may indicate whether their respective stack location is occupied. Containers may be preferably stacked as high as seven containers.

Figure 21:
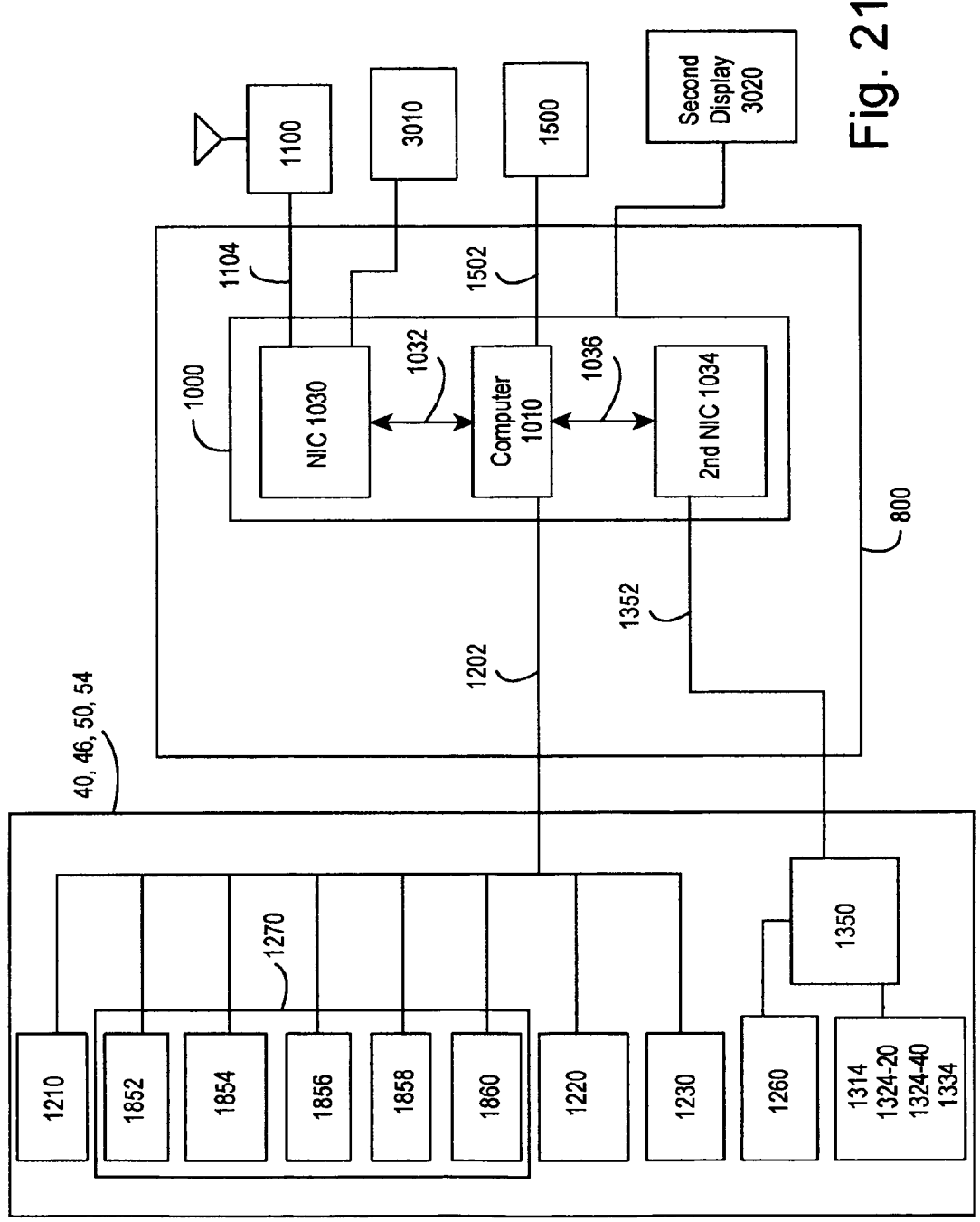
FIGS. 21 to 23 show various embodiments of the status reporting device for the side picker of FIG. 3A, the reach stacker of FIG. 4A, the top loader of FIG. 4C, straddle carrier of FIG. 4D.
Figure 22:
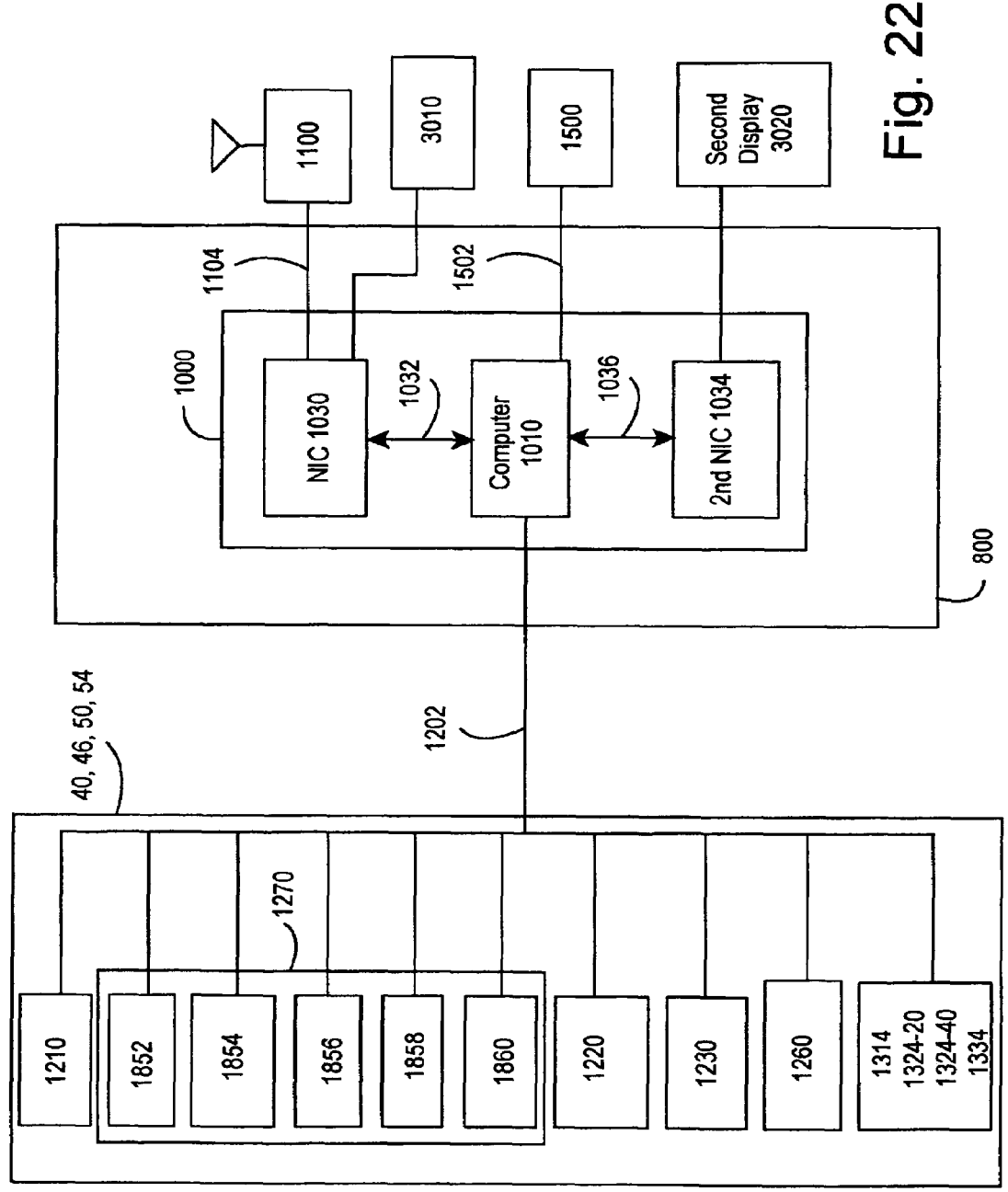
Figure 23:
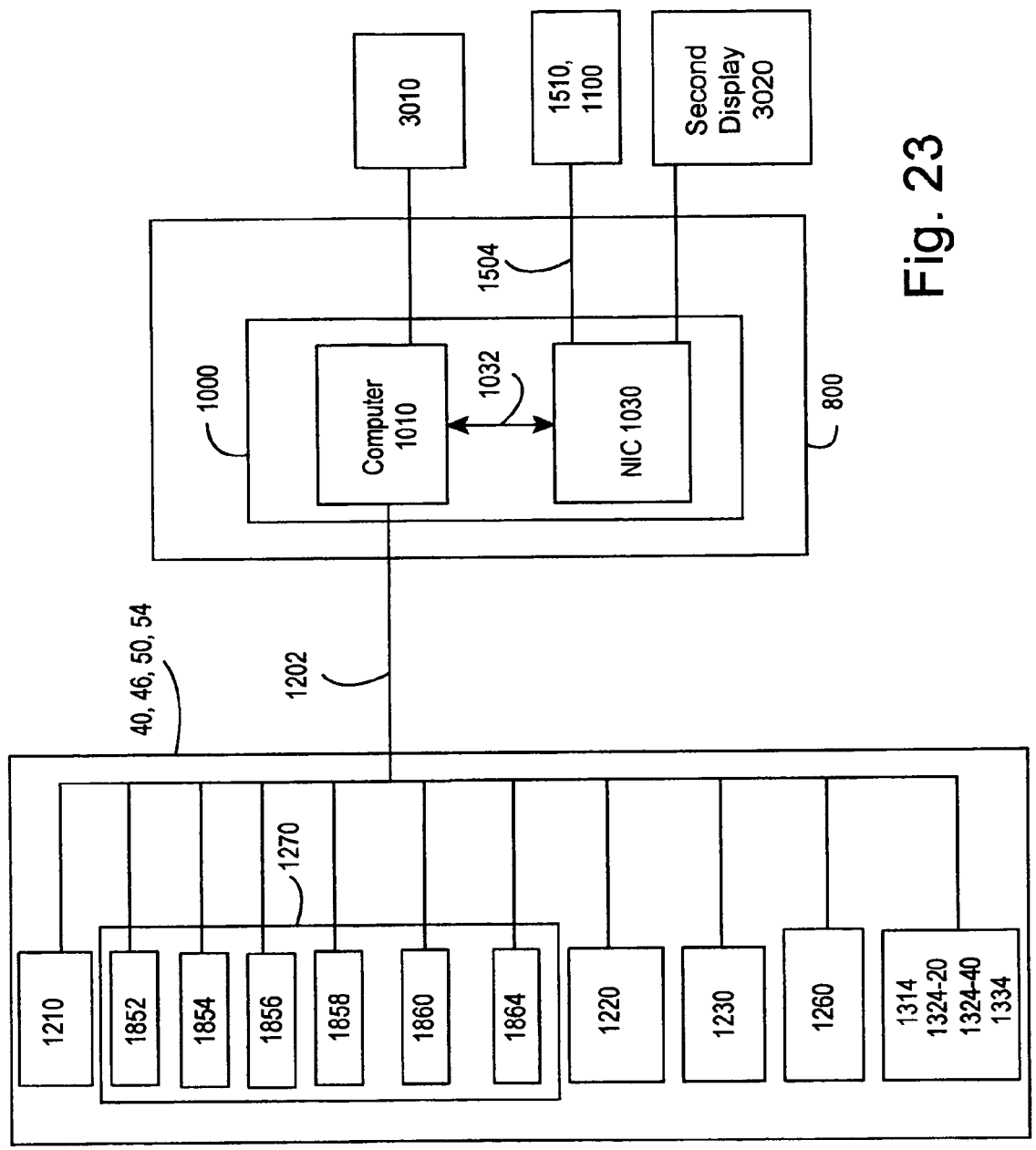

FIGS. 21 to 23 show various status reporting devices 800 for use with some or all of the following container handlers 78, which are members of the container handler list 80 of FIG. 4B:

The side picker 40 shown in FIG. 3A.

The reach stacker 46 shown in FIG. 4A.

The top handler 50 shown in FIG. 4C.

The straddle carrier 54 shown in FIG. 4D.

In FIGS. 21 to 23, the means for sensing state 1200 is disclosed in the details of its contents and communications.

In certain preferred embodiments, the status reporting device 800 of FIGS. 21 to 23, for use with the side picker 40, the top handler 50 and/or the straddle carrier 54, as well as the status reporting device 800 of FIGS. 17 to 20, for use with the rubber tire gantry crane 20, may sense the following.

The length of time the vehicle has run since it was started.

The compass reading 1860.

When the spreader has landed on a container 2 as the sensed landing state 1334.

When the spreader has locked on the container.

The container size 1226, which is preferably one of the members of the spreader state list 1420 of FIG. 12D. Further, the container size may preferably be one of the twenty foot container spread 1422, the forty foot container spread 1424 and the forty-five foot container spread 1426.

The container stack height 1264 may preferably range from one to seven containers in height. This may be preferably be measured in feet.

The reverse motion 1852.

The fuel level 1858 may be optionally provided.

And the sensed operator identity 1214 may be optionally provided.

In certain embodiments, the status reporting device 800 may use the means for wirelessly communicating 1100 instead of the means for determining 1500 the location 1900. The means for wirelessly communicating 1100 may sensed by an external radio system to determine the container handler location. This may be preferred in terms of the cost of production of the status reporting device.

In certain preferred embodiments, the status reporting device 800 of FIGS. 21 to 23, for use with the side picker 40, the top handler 50 and/or the straddle carrier 54, as well as the status reporting device 800 of FIGS. 17 to 20, for use with the rubber tire gantry crane 20, may implemented to include the following.

The means for spreader sensing 1320 may include a magnetic proximity switch on and/or near the status reporting device 800.

The reverse sensor may be communicatively coupled with the reverse buzzer on the vehicle.

The sixth providing 1272 of the compass reading 1860 may use the RS-422 protocol 2111.

The means for sensing container landing 1330 may include a proximity switch on and/or near the status reporting device 800.

The means for wirelessly communicating 1100 may be used to provide location of the vehicle. It may be further preferred that there are multiple means for wirelessly communicating, which may further preferably embody a radio frequency tag technology, including a version of the ANSI 371.1 scheme 2138. The radio frequency tag technology may preferably be compatible with the WHERENET™ products.

The first communicative coupling 1102 of the means for wirelessly communicating 1100 and the micro-controller module 1000 may use the RS-485 protocol 2109.

In certain preferred embodiments, the status reporting device 800 of FIGS. 21 to 23, for use with the side picker 40 and/or the top handler 50, may implemented to further include the following.

The means for container stack height sensing 1260 may include a draw wire encoder. The fifth providing 1262 of the container stack height 1264 may preferably use the RS-422 protocol 2111.

In certain preferred embodiments, the status reporting device 800 of FIGS. 21 to 23, for use with the straddle carrier 54, as well as the status reporting device 800 of FIGS. 17 to 20, for use with the rubber tire gantry crane 20, may implemented to include the following.

The means for sensing hoist height 1370 may include a hollow shaft or a shafted optical absolute encoder. The fifteenth providing 1372 of the hoist height 1374 may preferably use the RS-422 protocol 2111 and/or the Synchronous Serial Interface protocol 2101.

The means for sensing trolley position 1360 may include a hollow shaft or a shafted optical absolute encoder. The fourteenth providing 1362 of the trolley position 1364 may preferably use the RS-422 protocol 2111 and/or the Synchronous Serial Interface protocol 2101.

In certain preferred embodiments, the status reporting device 800 of FIGS. 21 to 23, for use with the side picker 40, the top handler 50 and/or the straddle carrier 54, as well as of FIGS. 17 to 20 for the rubber tire gantry crane 20, may be implemented using a programmable logic controller 1350 as in FIG. 13B. The following may be preferred in such situations.

The sixth providing 1272 of the compass reading 1860 may use the RS-422 protocol 2111.

The first communicative coupling 1102 of the means for wirelessly communicating 1100 and the micro-controller module 1000 may use the RS-485 protocol 2109.

In certain preferred embodiments, the status reporting device 800 of FIGS. 21 to 23, for use with the side picker 40, the top handler 50, and/or the straddle carrier 54, as well as of FIGS. 17 to 20 for the rubber tire gantry crane 20, may use a second display 3020.

It may be preferred to send the human operator messages that are displayed on the second display. These messages may include directions to pickup a container 2 from a communicated location in the terminal yard.

Preferably, the means for wirelessly communicating 1100 supports a bi-directional communications protocol. The bi-directional communications protocol may preferably support a version of the IEEE 802.11 access scheme 2134.

The bi-directional communications protocol may further support the reprogramming of non-volatile memory 1024.

A location tag associated with the vehicle may be commanded to blink.

The use of a display 3010 supporting operator interactions may require a bi-directional communications protocol.

FIG. 21 shows the status reporting device 800 communicating via couplings with The means for wirelessly communicating 1100.
The display 3010.
The second display 3020.
And the means for sensing state 1200.

In FIG. 21, the means for sensing state 1200 preferably includes

The means for sensing operator identity 1210,
The means for sensing container presence 1220,
The means for optical container code sensing 1230,
The means for sensing a machine state list member 1270, which provides the reverse motion 1852, the frequent stops count 1854, the collision state 1856, the fuel level 1858, the compass reading 1860, and the vehicle speed 1864,
The Programmable Logic Controller 1350, and
The means for determining 1500 location.

In FIGS. 18, 19, and 21, the Programmable Logic Controller 1350 further provides the computer 1010, via the second crane sensor coupling 1352, with the following:

The twistlock sensed state 1314,
By way of example, the spreader sensed state 1324, may further preferably include the spreader sense state at twenty foot 1324-20, and the spread sense state at forty foot 1324-40, and
the sensed landing state 1334.
The spreader sensed state 1324 may include other sizes, examples of which are shown in the spreader state list 1420 of FIG. 12D.

In FIGS. 18, 19, and 21, the Programmable Logic Controller 1350 further provides the computer 1010, via the second crane sensor coupling 1352, with the states of the means for container stack height sensing 1260. The Programmable Logic Controller 1350 may also sometimes preferably provide the spreader sensed state 1324.

FIG. 22 shows the status reporting device 800 communicating via couplings with The means for wirelessly communicating 1100.
The display 3010.
The second display 3020.
And the means for sensing state 1200.

In FIG. 22, the means for sensing state 1200 preferably includes

The means for sensing operator identity 1210,
The means for sensing container presence 1220,
The means for optical container code sensing 1230,
The means for container stack height sensing 1260,
The means for sensing a machine state list member 1270, which provides the reverse motion 1852, the frequent stops count 1854, the collision state 1856, the fuel level 1858, and the compass reading 1860, and
The twistlock sensed state 1314, the spreader sensed state 1324, which may further preferably include the spreader sense state at twenty foot 1324-20, and the spread sense state at forty foot 1324-40, and the sensed landing state 1334. The spreader sensed state 1324 may include other sizes, examples of which are shown in the spreader state list 1420 of FIG. 12D.
The means for determining 1500 location.

FIG. 23 shows the status reporting device 800 communicating via couplings with The means for wirelessly communicating 1100.

The display 3010.

The second display 3020.

And the means for sensing state 1200.

In FIG. 23, the means for sensing state 1200 preferably includes

The means for sensing operator identity 1210,

The means for sensing container presence 1220,

The means for optical container code sensing 1230,

The means for container stack height sensing 1260,

The means for sensing a machine state list member 1270, which provides the reverse motion 1852, the frequent stops count 1854, the collision state 1856, the fuel level 1858, the compass reading 1860, and the vehicle speed 1864, and The twistlock sensed state 1314, the spreader sensed state 1324, which may further preferably include the spreader sense state at twenty foot 1324-20, and the spread sense state at forty foot 1324-40, and the sensed landing state 1334.

The spreader sensed state 1324 may include other sizes, examples of which are shown in the spreader state list 1420 of FIG. 12D.

FIGS. 24 and 25 show various embodiments of the status reporting device 800 for the UTR truck 10 of FIG. 1. In these Figures the means for sensing state 1200 is disclosed in the details of its contents and communications. The UTR truck may be attached to the bomb cart 14, or a chassis 14, where the container 2 may be tied down.

FIG. 24, shows the status reporting device 800 communicating via couplings with The means for wirelessly communicating 1100.

The display 3010.

And the means for sensing state 1200.

In FIG. 24, the means for sensing state 1200 preferably includes

The means for sensing operator identity 1210.

The means for sensing container size 1216. This may preferably use an ultrasonic sensor.

The means for sensing container presence 1220.

The means for optical container code sensing 1230.

The means for sensing a machine state list member 1270, which provides the reverse motion 1852, the frequent stops count 1854, the collision state 1856, the fuel level 1858, and the vehicle speed 1864. It may be preferred that the means for sensing not include the wind speed 1862, as shown.

And a fifth wheel engage/disengage proximity sensor.

One alternative embodiment of the status reporting device 800 for a Quay crane 30 and/or the RTG crane 20 may preferably include an interface to the programmable logic controller 1350 using a Wheretag.

FIG. 25 shows the status reporting device 800 communicating via couplings with The means for wirelessly communicating 1100, preferably implemented using the means for wirelessly determining 1510.

The display 3010.

And the means for sensing state 1200.

In FIG. 25, the means for sensing state 1200 preferably includes

The means for sensing operator identity 1210.

The means for sensing container presence 1220.

The means for sensing a machine state list member 1270, which provides the reverse motion 1852, the frequent stops count 1854, the collision state 1856, the fuel level 1858, and the vehicle speed 1864. It may be preferred that the means for sensing not include the wind speed 1862, as shown.

And a fifth wheel engage/disengage proximity sensor.

The status reporting device 800 used on the bomb cart 14 and/or the chassis 14 may preferably resemble the status reporting device 800 for the UTR truck 10 shown in FIGS. 24 and 25 without those features which sense an engine and/or its fuel, as well as, sense the presence and/or identity of an operator.

The status reporting device 800 may also lack the means for optical container code sensing 1230.

The status reporting device 800 of FIGS. 24 and/or 25, for the UTR truck 10 may preferably operate as follows.

The micro-controller module 1000 may sense how long the UTR truck 10 has been running.

The micro-controller module 1000 may sense when the fifth wheel is engaged.

The micro-controller module 1000 may sense when the brakes are applied.

The micro-controller module 1000 may sense when the container 2 is a forty foot container.

The micro-controller module 1000 may sense when the container 2 is a twenty foot container and positioned in the front or back of a bomb cart 14.

The micro-controller module 1000 may sense when the container 2 is on a chassis.

The micro-controller module 1000 may sense the compass reading 1860.

Optionally, the micro-controller module 1000 may sense the fuel level 1858.

Optionally, the micro-controller module 1000 may receive the sensed operator identity 1214.

The means for wirelessly communicating 1100 may interface with the WHERENET™ radio tag system.

The means for wirelessly communicating 1100 may further be a WHERENET tag.

Communication through the means for wirelessly communicating 1100 may preferably occur when a container is engaged, a container is gained or leaves a bomb cart 14, and/or when the UTR truck 10 starts to move.

In certain embodiments, the status reporting device 800 may use the means for wirelessly communicating 1100 instead of the means for determining 1500 the location 1900. The means for wirelessly communicating 1100 may sensed by an external radio system to determine the container handler location. This may be preferred in terms of the cost of production of the status reporting device.

The status reporting device 800 of FIGS. 24 and/or 25, for the UTR truck 10 may preferably include the following sensor interfaces.

The fifth wheel engage-disengage may be sensed by a magnetic proximity switch.

The vehicle speed 1864 and/or movement may be sensed by the number of revolutions of the driveshaft.

The compass reading 1860 may interface using the RS-422 protocol 2111.

The container presence may preferably use an ultrasonic sonar with a four to twenty milliAmp (mA) analog output. This is measured by the micro-controller module 1000 to determine the distance.

Alternatively, the container presence may use a laser to determine distance.

The means for wirelessly communicating 1100 may be coupled to the micro-controller module 1000 using the RS-422 protocol 2111.

The determination of location may be achieved by the means for wirelessly communicating 1100, particularly implementing the WHERENE™ radio tag.

The radio tag may further be commanded to blink.

The reverse motion sensor may be based upon the reverse motion buzzer of the UTR truck 10.

In FIGS. 5B, and 17 to 25, the display 3010 is shown.

The display 3010 may communicate directly with the computer 1010, or communicate through one of the Network Interface Circuits (NICs).

The display 3010 may preferably be a Liquid Crystal display. However, one skilled in the art will recognize that there are many alternative means for presenting a status display.

The display 3010 may preferably be used to display status.

In FIGS. 21 to 23, the second display 3020 is shown.

The second display 3020 may communicate directly with the computer 1010, or communicating through one of the Network Interface Circuits (NICs).

The second display 3020 may preferably be a Liquid Crystal display. However, one skilled in the art will recognize that there are many alternative means for presenting a status display.

The second display 3020 may preferably be used to display command options, which may be available to an operator of the container handler 78.

A second display 3020 may also be used in the status reporting device 800 for a UTR truck 10.

In such situations, when the second display 3020 is present, the status reporting device 800 further includes a network interface circuit supporting a version of the IEEE 802.11 access scheme 2134.

The operator can receive messages as to where to go in the terminal yard to pickup a container 2.

The network interface circuit's support of the version of the IEEE 802.11 access scheme 2134, makes remote reprogramming of the status reporting device 800 possible.

FIGS. 17, 18, 21, 22, and 24 shows status reporting devices 800 including a second Network Interface Circuit 1034.

A second network interface coupling 1036 supports the computer 1010 communicating via the second network interface circuit 1034.

The network interface circuit 1030 and the second network interface circuit 1034 may preferably support distinct serial communications protocols.

By way of example, the network interface circuit 1030 may support RS-232, while the second network interface circuit 1034 may support Ethernet.

Both the network interface circuit 1030 and the second network interface circuit 1034 may preferably be implemented as components within a micro-controller, which also contains the computer 1010.

The status reporting device 800, including and its one or more communications protocols may support use of a TCP/IP stack, HTTP, java, and/or XML.

The preceding embodiments have been provided by way of example and are not meant to constrain the scope of the following claims.

What is claimed is:

1. An apparatus for making a status reporting device for a container handler, comprising:
   means for providing a micro-controller module communicatively coupled with a means for wirelessly communicating and communicatively coupled with a means for sensing a state of said container handler; and
   means for installing a program system into a memory accessibly coupled to a computer directing said micro-controller module;
   wherein said program system comprises program steps residing in said memory, of:
   using said means for sensing said state of said container handler to create a sensed state; and
   using said means for wirelessly communicating to communicate said sensed state and said location of said container handler;
   wherein said container handler moves a container at least twenty foot in length.

2. The apparatus of claim 1, wherein said computer is coupled with a network interface circuit; and
   wherein the means for providing said micro-controller module further comprising:
   means for coupling said network interface circuit to said means for wirelessly communicating;
   wherein the program step using said means for wirelessly communicating is further comprised of the program step of:
   interacting with said network interface circuit coupling to said means for wirelessly communicating to communicate said sensed state and said location for said container handler.

3. The apparatus of claim 2, wherein said network interface circuit supports at least one wireline communications protocol in coupling with said means for wirelessly communicating.

4. The apparatus of claim 3, wherein said wireline communications protocol supports a version of at least one member of a serial protocol list, including
   an Ethernet protocol,
   an RS-232 protocol,
   an RS-485 protocol,
   an RS-422 protocol,
   an Universal Serial Bus (USB) protocol,
   a Firewire protocol,
   a Synchronous Serial Interface (SSI) protocol,
   a Serial Peripheral Interface (SPI),
   an Inter-IC protocol (I2C), and
   a Controller Area Network (CAN) protocol.

5. The apparatus of claim 1, wherein said means for wirelessly communicating supports communicating using at least one version of at least one member of a wireless modulation-demodulation scheme list;
   wherein said wireless modulation-demodulation scheme list is comprised of a time division multiple access scheme, a frequency division multiple access scheme, and a spread spectrum scheme.

6. The apparatus of claim 5, wherein said spread spectrum scheme includes at least one form of the list comprising a code division multiple access scheme, a frequency hopping multiple access scheme, a time hopping multiple access scheme, and an orthogonal frequency division multiple access scheme.

7. The apparatus of claim 5, wherein said spread spectrum scheme includes a version of an ANSI 371.1 radio frequency tag scheme.

8. The apparatus of claim 5,
   wherein at least one said versions of said time division multiple access scheme includes a GSM access scheme;
   wherein at least one said versions of said frequency division multiple access scheme includes an AMPs access scheme;
   wherein at least one said versions of said code division multiple access scheme includes at least one member of the CDMA scheme list; wherein said CDMA list includes an IS-95 access scheme, and a Wideband CDMA access scheme; and wherein at least one said versions of said orthogonal frequency division multiple access scheme includes an IEEE 802.11 access scheme.

9. The apparatus of claim 8, wherein said IEEE 802.11 access scheme includes one of a version of an IEEE 802.11b access scheme and a version of said IEEE 802.11g access scheme.

10. The apparatus of claim 1, wherein said means for sensing includes a means for sensing an operator identity providing a sensed operator identity.

11. The apparatus of claim 10, wherein said sensed state includes said sensed operator identity.

12. The apparatus of claim 1, wherein said means for sensing includes a means for sensing a container presence to create a sensed container present.

13. The apparatus of claim 12, wherein said sensed state includes said sensed container present.

14. The apparatus of claim 1, wherein said means for sensing includes a means for optically sensing a container code on a container providing an optical container characteristic.

15. The apparatus of claim 14, wherein said sensed state includes said optical container characteristic.

16. The apparatus of claim 14, wherein said optical container characteristic includes at least one instance of a member of a container code characteristic list;

wherein said container code characteristic list includes a container code text, a view of said container code, and a compression of said view of said container code.

17. The apparatus of claim 16, wherein said means for optically sensing said container code includes at least one video camera to create at least one instance of said view of said container code.

18. The apparatus of claim 17, wherein said video camera create at least one instance of said compression of said view of said container code.

19. The apparatus of claim 14, wherein said means for optically sensing said container code includes at least one member of the list comprising:

a video interface to receive at least one of said optical characteristics of said container code;

at least one video imaging device to at least partly create at least one of said optical characteristics of said container code; and at least one image processor to at least partly create at least one of said optical characteristics of said container code.

20. The apparatus of claim 1, wherein said means for sensing includes a means for radio frequency sensing a radio frequency tag on a container providing a container radio frequency tag.

21. The apparatus of claim 20, wherein said sensed state includes said container radio frequency tag.

22. The apparatus of claim 1, wherein said container handler is at least one member of a stacking handler list comprising a rubber tire gantry crane, a quay crane, a side picker, a reach stacker, a top loader, and a straddle carrier.

23. The apparatus of claim 22, wherein said means for sensing includes a means for sensing a stack height for a container providing a container stack height.

24. The apparatus of claim 23, wherein said sensed state includes said container stack height.

25. The apparatus of claim 23, wherein said means for sensing said stacking height includes a stacking height sensor interface to a stacking height sensor on said container handler.

26. The apparatus of claim 22, wherein said means for sensing includes at least one member of the crane sensor means list creating at least one member of a crane state list;

wherein said member of said crane sensor means list comprises any of:

means for sensing a twistlock to create a twistlock sensed state belonging to a twistlock state list;

means for sensing a spreader to create a spreader sensed state belonging to a spreader state list; and means for sensing a landing to create a sensed landing state belonging to a landing state list;

wherein said twistlock state list includes a twistlock-on state and a twistlock-off state;

wherein said spreader state list includes a ten foot container spread, a twenty foot container spread, a thirty foot container spread, a forty foot container spread, and a forty five foot container spread;

wherein said landing state list comprises a landed state and a not-landed state;

wherein said crane sensor state list comprises said twistlock sensed state, said spreader sensed state, and said sensed landing state.

27. The apparatus of claim 26, wherein said sensed state includes at least one member of the list comprising said twistlock sensed state, said spread sensed state, and said sensed landing state.

28. The apparatus of claim 26, wherein said means for sensing includes coupling to a crane spreader interface connection to at least partly provide at least one of said members of said crane state list.

29. The apparatus of claim 28, wherein said coupling to said crane spreader interface connection includes said computer coupling to said crane spreader interface connection.

30. The apparatus of claim 26, wherein said means for sensing includes coupling to a Programmable Logic Controller (PLC) to at least partly provide at least one of said members of said crane state list.

31. The apparatus of claim 30, wherein coupling to said PLC includes a serial communications coupling to said computer.

32. The apparatus of claim 31, wherein said serial communications coupling supports a version of at least one member of a serial protocol list, including an Ethernet protocol, an RS-232 protocol, an RS-422 protocol, an RS-485 protocol, an Universal Serial Bus (USB) protocol, a Firewire protocol, a Synchronous Serial Interface (SSI) protocol, a Serial Peripheral Interface (SPI), an Inter-IC protocol (I2C), and a Controller Area Network (CAN) protocol.

33. The apparatus of claim 1, wherein said means for sensing includes a means for sensing at least one member of a machine state list of said container handler;

wherein said member of said machine state list includes a reverse motion, a frequent stops count, a collision state, a fuel level, a compass reading, a wind speed, and a vehicle speed.

34. The apparatus of claim 33, wherein said wind speed includes an indication of a wind direction.

35. The apparatus of claim 33, wherein said sensed state includes an instance of at least one member of said machine state list.

36. The apparatus of claim 1, wherein the means for providing said micro-controller module further comprises:
means for providing said micro-controller module communicatively coupled to said means for sensing said state of said container handler.

37. The apparatus of claim 1, wherein the means for providing said micro-controller module is further comprised of:
means for providing said micro-controller module communicatively coupled to a means for locating said container handler.

38. The apparatus of claim 37, wherein the program system is further comprised of the program steps of:
using said means for locating said container handler to at least partly determine said location of said container handler; and
using said means for wirelessly communicating to communicate said location of said container handler.

39. The apparatus of claim 37, wherein said means for locating includes an interface to a Global Positioning System (GPS).

40. The apparatus of claim 39, wherein said means for locating includes an interface to a Differential Global Positioning System (DGPS).

41. The apparatus of claim 37, wherein said means for locating includes a radio location-tag unit.

42. The apparatus of claim 1, wherein said means for wirelessly communicating is further comprised of a means for wirelessly determining said location of said container handler.

43. The apparatus of claim 42, wherein the program system is further comprised of the program steps of:
using said means for locating said container handler to at least partly determine said location of said container handler; and
using said means for wirelessly communicating to communicate said location of said container handler.

44. The apparatus of claim 42, wherein said means for wirelessly communicating includes a radio location-tag unit.

45. The apparatus of claim 1, wherein said container handler is at least one member of a container handler list comprising an UTR truck, a bomb cart, a rubber tire gantry crane, a quay crane, a side picker, a reach stacker, a top loader, a straddle carrier, and a chassis rotator.

46. The apparatus of claim 1, wherein said computer includes at least one member of a list comprising an instruction processor, an inferential engine, a neural network, and a finite state machine;
wherein said instruction processor includes at least one instruction processing element and at least one data processing element; wherein each of said data processing elements is controlled by at least one of said instruction processing elements.

47. The apparatus of claim 1, means for providing said micro-controller module is further comprised of:
means for communicatively coupling said micro-controller module with said means for wirelessly communicating; and
means for communicatively coupling said micro-controller module with said means for sensing said state of said container handler.

48. The apparatus of claim 1, wherein said memory is comprised of a non-volatile memory accessibly coupled with said computer.

49. The apparatus of claim 48, wherein the means for installing said program system is further comprised of at least one member of the list comprising:
means for altering at least part of said non-volatile memory to install at least part of at least one of said program steps; and
means for installing a memory module including at least part of at least one of said program steps residing in said non-volatile memory to create at least part of said accessibly coupled memory.

50. The apparatus of claim 1, wherein said second computer includes at least one member of a list comprising an instruction processor, an inferential engine, a neural network, and a finite state machine;
wherein said instruction processor includes at least one instruction processing element and at least one data processing element; wherein each of said data processing elements is controlled by at least one of said instruction processing elements.

51. A method of making a status reporting device for a container handler, comprising the steps of:
providing a micro-controller module communicatively coupled with a means for wirelessly communicating and communicatively coupled with a means for sensing a state of said container handler; and
installing a program system into a memory accessibly coupled to a computer directing said micro-controller module;
wherein said program system comprises program steps residing in said memory, of:
using said means for sensing said state of said container handler to create a sensed state; and
using said means for wirelessly communicating to communicate said sensed state of said container handler;
wherein said container handler moves a container at least twenty foot in length.

52. The method of claim 51, wherein said computer is coupled with a network interface circuit; and
wherein the step providing said micro-controller module is further comprised of the step of:
coupling said network interface circuit to said means for wirelessly communicating;
wherein the program step using said means for wirelessly communicating is further comprised of the program step of:
interacting with said network interface circuit coupling to said means for wirelessly communicating to communicate said sensed state and said location for said container handler.

53. The method of claim 52, wherein said network interface circuit supports at least one wireline communications protocol in coupling with said means for wirelessly communicating.

54. The method of claim 53, wherein said wireline communications protocol supports a version of at least one member of a serial protocol list, including
an Ethernet protocol,
an RS-232 protocol,
an RS-422 protocol,
an RS-485 protocol,
an Universal Serial Bus (USB) protocol,
a Firewire protocol,
a Synchronous Serial Interface (SSI) protocol,
a Serial Peripheral Interface (SPI),
an Inter-IC protocol (I2C), and
a Controller Area Network (CAN) protocol.

55. The method of claim 52, wherein said spread spectrum scheme includes at least one form of the list comprising a code division multiple access scheme, a frequency hopping multiple access scheme, a time hopping multiple access scheme, and an orthogonal frequency division multiple access scheme.

56. The method of claim 55, wherein said spread spectrum scheme includes at least one form of the list comprising a code division multiple access scheme, a frequency hopping multiple access scheme, a time hopping multiple access scheme, and an orthogonal frequency division multiple access scheme.

57. The method of claim 56,
wherein said spread spectrum scheme includes a version of an ANSI 371.1 radio frequency tag scheme.

58. The method of claim 56,
wherein at least one said versions of said time division multiple access scheme includes a GSM access scheme;
wherein at least one said versions of said frequency division multiple access scheme includes an AMPs access scheme;
wherein at least one said versions of said code division multiple access scheme includes at least one member of the CDMA scheme list; an IS-95 access scheme, and a Wideband CDMA access scheme;
wherein at least one said versions of said orthogonal frequency division multiple access scheme includes at least one of the IEEE 802.11 access schemes.

59. The method of claim 58, wherein said IEEE 802.11 access schemes includes a version of an IEEE 802.11b access scheme and a version of an IEEE 802.11g access scheme.

60. Said status reporting device as a product of claim 55.

61. The method of claim 51, wherein said means for wirelessly communicating supports communicating using at least one version of at least one member of a wireless modulation-demodulation scheme list;
wherein said wireless modulation-demodulation scheme list is comprised of a time division multiple access scheme, a frequency division multiple access scheme, a spread spectrum access scheme.

62. The method of claim 51, wherein said means for sensing includes a means for sensing an operator identity providing a sensed operator identity.

63. The method of claim 62, wherein said sensed state includes said sensed operator identity.

64. The method of claim 51, wherein said means for sensing includes a means for sensing a container presence to create a sensed container present.

65. The method of claim 64, wherein said sensed state includes said sensed container present.

66. The method of claim 51, wherein said means for sensing includes a means for optically sensing a container code on a container providing an optical container characteristic.

67. The method of claim 66, wherein said sensed state includes said optical container characteristic.

68. The method of claim 66, wherein said optical container characteristic includes at least one instance of a member of a container code characteristic list;
wherein said members of said container code characteristic list include a container code text, a view of said container code, and a compression of said view of said container code.

69. The method of claim 68, wherein said means for optically sensing said container code includes at least one member of the list comprising:
a video interface to receive at least one of said optical characteristics of said container code;
at least one video imaging device to at least partly create at least one of said optical characteristics of said container code; and at least one image processor to at least partly create at least one of said optical characteristics of said container code.

70. The method of claim 69, wherein said video camera creates at least one instance of said compression of said view of said container code.

71. The method of claim 51, wherein said means for sensing includes a means for radio frequency sensing a radio frequency tag on a container providing a container radio frequency tag.

72. The method of claim 71, wherein said sensed state includes said container radio frequency tag.

73. The method of claim 51, wherein said container handler is at least one member of a stack handler list comprising, a rubber tire gantry crane, a quay crane, a side picker, a reach stacker, a top loader, and a straddle carrier.

74. The method of claim 73, wherein said means for sensing includes a means for sensing a stack height for a container providing a container stack height.

75. The method of claim 74, wherein said sensed state includes said container stack height.

76. The method of claim 74, wherein said means for sensing said stacking height includes a stacking height sensor interface to a stacking height sensor on said container handler.

77. The method of claim 73, wherein said means for sensing includes at least one member of the crane sensor means list creating at least one member of a crane state list;
wherein said members of said crane sensor means list include:
means for sensing a twistlock to create a twistlock sensed state belonging to a twistlock state list;
means for sensing a spreader to create a spreader sensed state belonging to a spreader state list; and
means for sensing a container landing to create a sensed landing state belonging to a landing state list;
wherein said twistlock state list includes a twistlock-on state and a twistlock-off state;
wherein said spreader state list includes a twenty foot container spread, and a forty foot container spread;
wherein said landing state list comprises a landed state and a not-landed state;
wherein said crane sensor state list comprises said twistlock sensed state, said spreader sensed state, and said sensed landing state.

78. The method of claim 77, wherein said sensed state includes at least one member of the list comprising said twistlock sensed state, said spread sensed state, and said sensed landing state.

79. The method of claim 77, wherein said means for sensing includes coupling to a crane spreader interface connection to at least partly provide at least one of said members of said crane state list.

80. The method of claim 79, wherein said coupling to said crane spreader interface connection includes said computer coupling to said crane spreader interface connection.

81. The method of claim 77, wherein said means for sensing includes coupling to a Programmable Logic Controller (PLC) to at least partly provide at least one of said members of said crane state list.

82. The method of claim 81, wherein coupling to said PLC includes a serial communications coupling to said computer.

83. The method of claim 82, wherein said serial communications coupling supports a version of at least one member of a serial protocol list, including
an Ethernet protocol,
an RS-232 protocol,
an RS-422 protocol,
an RS-485 protocol, an Universal Serial Bus (USB) protocol,
a Firewire protocol,
a Synchronous Serial Interface (SSI) protocol,
a Serial Peripheral Interface (SPI),
an Inter-IC protocol (I2C), and
a Controller Area Network (CAN) protocol.

84. The method of claim 51, wherein the step providing said micro-controller module is further comprised of the step of:
providing said micro-controller module communicatively coupled to said means for sensing said state of said container handler.

85. The method of claim 51, wherein the step providing said micro-controller module is further comprised of the step of:
providing said micro-controller module communicatively coupled to a means for locating said container handler.

86. The method of claim 85, wherein the program system is further comprised of the program steps of:
using said means for locating said container handler to at least partly determine said location of said container handler; and
using said means for wirelessly communicating to communicate said location of said container handler.

87. The method of claim 85, wherein said means for locating includes an interface to a Global Positioning System (GPS).

88. The method of claim 87, wherein said means for locating includes an interface to a Differential Global Positioning System (DGPS).

89. The method of claim 85, wherein said means for locating includes a radio location-tag unit.

90. The method of claim 51, wherein said means for wirelessly communicating is further comprised of a means for wirelessly determining said location of said container handler.

91. The method of claim 90, wherein the program system is further comprised of the program steps of:
using said means for locating said container handler to at least partly determine said location of said container handler; and
using said means for wirelessly communicating to communicate said location of said container handler.

92. The method of claim 90, wherein said means for wirelessly communicating includes a radio location-tag unit.

93. The method of claim 51, wherein said container handler is at least one member of a container handler list comprising an UTR truck, a bomb cart/chassis, a rubber tire gantry crane, a quay crane, a side picker, a reach stacker, a top loader, a straddle carrier, and a chassis rotator.

94. The method of claim 93, wherein said means for sensing includes a means for sensing at least one member of a machine state list of said container handler;
wherein said machine state list is comprised of a reverse motion, a frequent stops count, a collision state, a fuel level, a compass reading, a wind speed, and a vehicle speed.

95. The method claim 94, wherein said wind speed includes an indication of a wind direction.

96. The method of claim 94, wherein said sensed state includes an instance of at least one member of said machine state list.

97. The method of claim 51, wherein said memory is comprised of a non-volatile memory accessibly coupled with said computer.

98. The method of claim 97, wherein the step installing said program system is further comprised of at least one member of the list comprising the steps of:
altering at least part of said non-volatile memory to install at least part of at least one of said program steps; and
installing a memory module including at least part of at least one of said program steps residing in said non-volatile memory to create at least part of said accessibly coupled memory.

99. The method of claim 97, wherein said computer includes at least one member of a list comprising an instruction processor, an inferential engine, a neural network, and a finite state machine;
wherein said instruction processor includes at least one instruction processing element and at least one data processing element; wherein each of said data processing elements is controlled by at least one of said instruction processing elements.

* * * * *

UNITED STATES PATENT AND TRADEMARK OFFICE
CERTIFICATE OF CORRECTION

PATENT NO. : 7,598,863 B2
APPLICATION NO. : 11/130822
DATED : October 6, 2009
INVENTOR(S) : Henry S. King and Toru Takehara It is certified that error appears in the above-identified patent and that said Letters Patent is hereby corrected as shown below:

(1) Please amend claim 1 to add the following text after the words "at least twenty foot in length" (found at column 26 Line 12):

; at least one second computer controlling said means for providing and said means for installing; wherein said second computer is at least partially controlled by a second program system comprising program steps residing in a second memory accessibly coupled to said second computer; wherein said second program system is comprised of the program steps of: providing a micro-controller module communicatively coupled with a means a for wirelessly communicating and communicatively coupled with a means for sensing a state of said container handler; and installing a program system into a memory accessibly coupled to a computer directing said micro-controller module; said second computer controlling an assembly device receiving said micro-controller module, said means for wirelessly communicating, and said means for sensing said state of said container handler to create said status reporting device; wherein said second program system is comprised of at least one member of the list of the program steps of: communicatively coupling said micro-controller module with said means for wirelessly communicating; and communicatively coupling said micro-controller module with said means for sensing said state of said container handler.

(2) Please amend claim 51 to add the following text after the words "at least twenty foot in length" (found at column 30 Line 33):

; at least one second computer controlling said means for providing and said means for installing; wherein said second computer is at least partially controlled by a second program system comprising program steps residing in a second memory accessibly coupled to said second computer; wherein said second program system is comprised of the program steps of: providing a micro-controller module communicatively coupled with a means a for wirelessly communicating and communicatively coupled with a means for sensing a state of said container handler; and installing a program system into a memory accessibly coupled to a computer directing said micro-controller module; said second computer controlling an assembly device Signed and Sealed this
Twenty-third Day of August, 2011

David J. Kappos
*Director of the United States Patent and Trademark Office* receiving said micro-controller module, said means for wirelessly communicating, and said means for sensing said state of said container handler to create said status reporting device; wherein said second program system is comprised of at least one member of the list of the program steps of: communicatively coupling said micro-controller module with said means for wirelessly communicating; and communicatively coupling said micro-controller module with said means for sensing said state of said container handler.